United States Patent [19]
Faris

[11] Patent Number: 5,828,427
[45] Date of Patent: Oct. 27, 1998

[54] COMPUTER-BASED IMAGE DISPLAY SYSTEMS HAVING DIRECT AND PROJECTION MODES OF VIEWING

[75] Inventor: Sadeg M. Faris, Pleasantville, N.Y.

[73] Assignee: Reveo, Inc., Hawthorne, N.Y.

[21] Appl. No.: 230,779

[22] Filed: Apr. 21, 1994

Related U.S. Application Data

[63] Continuation-in-part of Ser. No. 126,077, Sep. 23, 1993, Pat. No. 5,537,144, which is a continuation of Ser. No. 536,190, Jun. 11, 1990, abandoned.

[51] Int. Cl.$^6$ ........................ G02F 1/1335; G02F 1/1347; G02B 21/56; G02B 21/132
[52] U.S. Cl. ................................ 349/5; 349/15; 349/57; 349/58; 349/64; 349/65; 349/68; 349/70; 349/77; 349/86
[58] Field of Search .................................. 359/41, 50, 51, 359/53, 63, 69, 465; 353/119, 122, DIG. 3, DIG. 5, 71, 72; 345/32, 104; 362/31, 32; 385/129, 130, 901; 364/231.1; 349/5, 15, 57, 58, 62, 64, 65, 86, 77, 96

[56] References Cited

U.S. PATENT DOCUMENTS

| | | | |
|---|---|---|---|
| 4,138,195 | 2/1979 | Saurer et al. | 359/79 |
| 4,917,465 | 4/1990 | Conner et al. | |
| 4,950,072 | 8/1990 | Honda | |
| 5,041,965 | 8/1991 | Chen | |
| 5,049,866 | 9/1991 | Miyajima et al. | 359/40 |
| 5,050,946 | 9/1991 | Hathaway et al. | |

(List continued on next page.)

OTHER PUBLICATIONS

"Multiplicity of Discharge Channels For a Flat Fluorescent Lamp to Backlight a Full Color LCD" 1 M. Anandan and Doug Ketchum, of Thomas Electronics, Inc. Wayne, New Jersey.

(List continued on next page.)

Primary Examiner—William L. Sikes
Assistant Examiner—Tai V. Duong
Attorney, Agent, or Firm—Thomas J. Perkowski, Esq.

[57] ABSTRACT

An electro-optical backlighting panel construction for use in portable computer-based systems having direct and projection viewing modes of operation. In the illustrative embodiments of the present invention, the electro-optical backlighting panel is integrated with a LCD display panel, a micropolarization panel, and a touch-screen writing panel to provide several different types of portable computer-based systems including, for example, a portable notebook computer, a computer-driven image display device, and a portable pen-computing device. In general, each of these computer-based systems are capable of selectively displaying color video images on an actively driven display surface, or projecting such video images onto a wall surface or projection screen. These computer-based systems can be easily reconfigured for projection viewing without any sort of physical modification to the LCD display panel assembly. If desired, the these computer-based systems can be used to directly view "spatially-multiplexed" images of 3-D objects or imagery during the direct viewing mode, and when desired these spatially-multiplexed images can be projected onto a wall surface or projection screen during the projection viewing mode. When the spatially-multiplexed images are viewed through electrically-passive polarized glasses, the 3-D object is perceived with stereoscopic depth sensation in either mode of viewing. A portable light projection accessory device is provided for use with the portable computer-based systems of the present invention. In the illustrative embodiments, the portable light projection device has first and second housing portions that are interconnected by a foldable structure that permits the first and second housing portions to be selectively reconfigured for simple trouble-free use during the projection viewing mode of operation, and for compact storage during the direct viewing mode of operation.

41 Claims, 23 Drawing Sheets

U.S. PATENT DOCUMENTS

| | | |
|---|---|---|
| 5,052,078 | 10/1991 | Hosoi . |
| 5,090,800 | 2/1992 | Ushiro ........................................ 353/71 |
| 5,099,343 | 3/1992 | Margerum et al. ........................ 359/48 |
| 5,101,197 | 3/1992 | Hix et al. . |
| 5,175,672 | 12/1992 | Conner et al. . |
| 5,264,992 | 11/1993 | Hogdahl et al. . |
| 5,325,218 | 6/1994 | Willett et al. .............................. 359/53 |
| 5,347,324 | 9/1994 | Sasaki et al. ............................ 348/789 |
| 5,353,075 | 10/1994 | Conner et al. . |
| 5,526,146 | 6/1996 | Goodman et al. ......................... 359/40 |
| 5,537,233 | 7/1996 | Miura et al. ............................... 359/48 |

OTHER PUBLICATIONS

"A Non–Imaging CCFT Coupler for LCD Backlighting" by F. Lin, of CTX Opt–Electronics Corp., Taiwa R.O.C., published in SID 94 Applications Digest, pp. 14–15, 1994.

"A Full–Color Field–Sequential LCD Using Modulated Backlight" by H. Hasebe, and S. Kobayashi, Tokyo University of Agriculture and Technology, Tokyo, Japan, published in SID 85 Digest, pp. 81–8 1985.

"Invited Address: New Backlighting Technologies for LCDs" by Y. Mesaki, et al. of Fujitsu L. published in SID 94 Digest, 1994, pp. 281–284.

"New Backlighting Technologies for LCDs" by Kevin J. Hathaway, Jeffery A. Hawthorne and Allan Fleischer, of Display Engineering, Inc., Santa Rosa, CA., published in Society of Information Display (SI 91 Digest, pp. 751–754, 1991.

"A Flat Collimator: A Backlighting Assembly Utilizing Microprisms for High Energy Efficiency" by Y. Tai and H. Zou, of BriteView Technologies, Inc. of Toledo, Ohio, published in SID 94 Digest Applicatio Digest, pp. 10–13, 1994.

"High–Brightness Backlights for Color LCDs" by S. Lu Bohaty, of Landmark Technology, San Jose, C. published in SID 94 Applications Disest, pp. 6–9.

Desktop Projection Products: LCD Projection Panel, LCD Projectors and Interactive Pointer Syste catalogue by Proxima, Inc Brochure No. 709–001174–1.

"Figure 1: How the Touch Screen Works" in the Newton MessagePad, published in Oct. 1 MacUser (1 Page).

"Diffraction–grating–enhanced light emission from tunnel junctions" by J.R. Kirtley, et al. I Thomas J. Watson Research Center, Yorktown Heights, Applied Physics Letters vol. 37, No. 5, Sep. 1980, pp. 435–437.

"An LCD to Write On" by Kevin Hathaway and Jefferey Hawthorne, published in vol. 10, Information Display, 1991 (pp. 10–13).

"Micropolarizer Arrays Applied to a New Class of Stereoscopic Imaging" by Sadeg M. Faris, vol. 91, SID Digest 91, pp. 840–843, 1991.

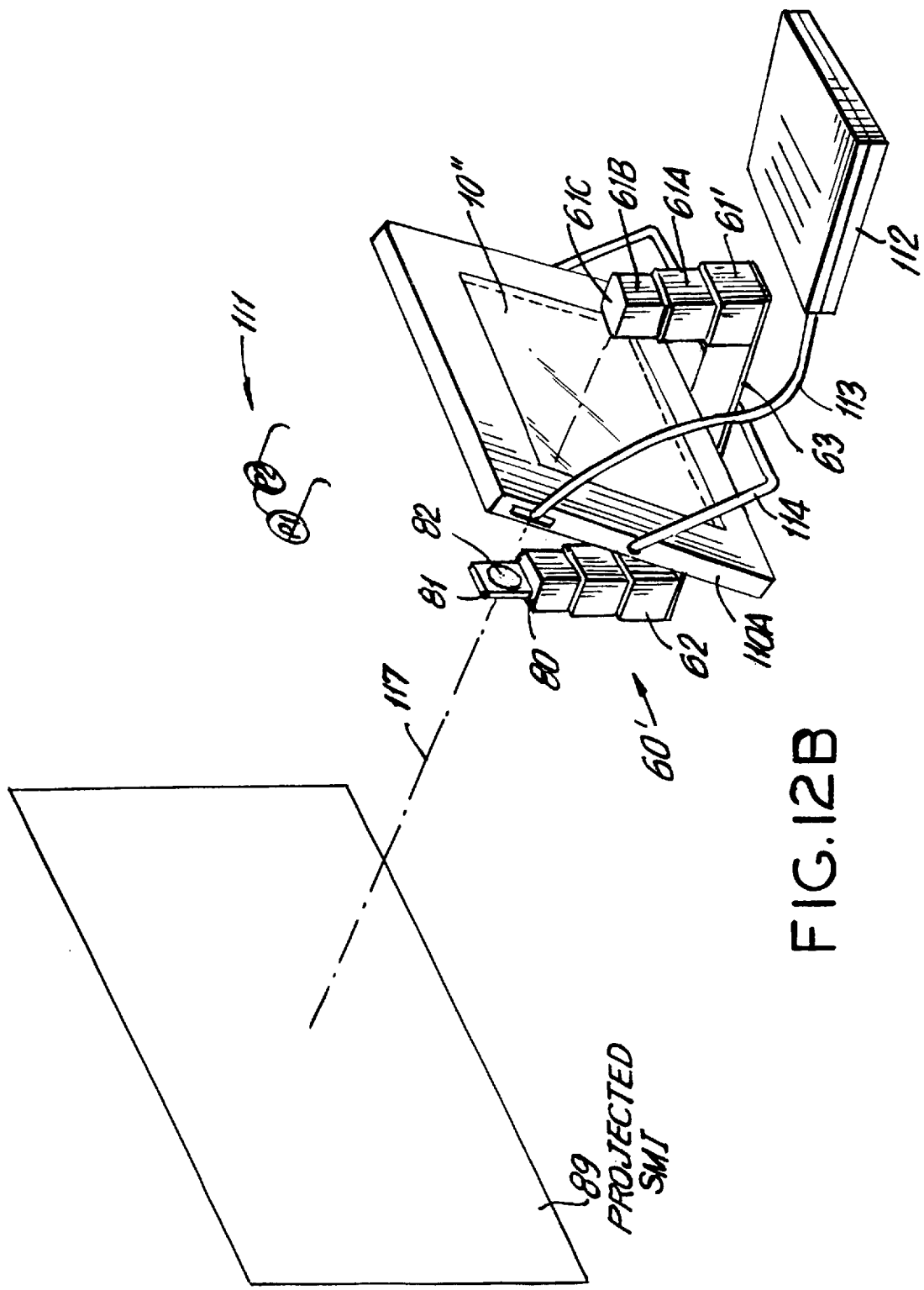

COMPUTER-BASED IMAGE DISPLAY SYSTEMS HAVING DIRECT AND PROJECTION MODES OF VIEWING

This Application is a Continuation-in-Part of: application Ser. No. 08/126,077 by Sadeg M. Faris filed Sep. 23, 1993, now U.S. Pat. No. 5,537,144, which is a Continuation of application Ser. No. 07/536,190 by Sadeg M. Faris filed Jun. 11, 1990, now abandoned.

BACKGROUND OF INVENTION

1. Field of Invention

The present invention relates to electro-optical backlighting panels for use in illuminating flat panel displays, optical transparencies, film structures and the like.

2. Brief Description of the Prior Art

Most portable computer system include a flat liquid crystal display(LCD) panel for directly viewing video imagery displayed thereon. Portable computer systems of this type include notebook, laptop, and palmtop computers.

In general, prior art LCD display panels have essentially the same basic construction, in that each includes a conventional backlighting structure affixed to the rear surface of either a passive or active matrix LCD panel. Several different backlighting panel designs are described in the technical paper "New Backlighting Technologies for LCDs" by Kevin J. Hathaway, et al., published at pages 751–754 in SID 91 Digest. In recent times, the "light pipe" backlight design, in particular, has been used in many commercially available notebook computers.

Specifically, prior art "light pipe" backlight assemblies are constructed from a rectangularly shaped light guiding panel, typically fabricated from an acrylic plastic sheet having a thickness of about 4 millimeters or so. Along the opposite side edges of the acrylic sheet, a pair of miniature fluorescent light tubes are mounted within suitably designed light reflective mounts. The function of the fluorescent light tubes is to produce and direct incoherent light into the interior of the light guiding panel within which the light is typically bounded by the well known principle of "total internal reflection". Under ideal conditions, light will not leak out of the surfaces of the acrylic plastic sheet. However, light can be extracted of leaked out from these surfaces by forming therein scratches, undulations, or any other means of locally altering the critical angle for total internal reflection. By achieving light extraction in this manner, the backlighting panel can be used to illuminate a LCD panel.

In order to compensate for the decrease in light intensity in the light guiding panel at distances away from the fluorescent tubes, a light extracting pattern is permanently formed on one or both surfaces of the light guiding panel. Typically the light extracting pattern is realized as a dot pattern permanently embossed or sandblasted upon the front surface of the acrylic light guiding panel. In order to achieve light intensity compensation along the light guiding panel, the density of the dot pattern is made to increase quadratically with distance from the fluorescent light tubes. With this construction, a constant backlighting brightness is maintained across the light guiding panel.

In order to integrate (i.e. diffuse) the spotted distribution of light emanating from the light extracting pattern towards the LCD panel, a first light diffusing sheet is placed on top of the light guiding panel. Typically, the first light diffuser is made from one or more thin sheets of translucent plastic attached to the front surface of the light guiding panel. In most commercial "light pipe" backlight designs, a second light diffusing sheet is placed over the rear surface of the light guiding panel to diffuse the spotted distribution of light emanating from the permanently formed light extracting pattern towards the reflective surface disposed behind the light guiding panel. Typically, the second light diffusing is made from one or more thin sheets of translucent plastic attached to the rear surface of the light guiding panel. Together, the light guiding panel, fluorescent light tubes, light diffusing sheets and the reflective layer cooperate to produce a plane of backlight having a uniform spatial intensity for optical processing by the LCD panel affixed to the backlighting panel.

While the prior art backlighting panel design described above has proven useful in the direct viewing of visual imagery on LCD display screens, its permanently formed light extracting pattern renders it unsuitable in projection viewing modes of operation. This fact is best illustrated by example.

In the recently introduced notebook computer, marketed under the tradename "Cruiser" by EMCO/REVERED Technologies, Inc., the above-described "light pipe" backlighting panel design is used to construct a portable computer system having both direct and projection viewing modes of operation. In the direct viewing mode, the prior art backlighting panel is positioned against the active-matrix LCD panel. Each time the user desires to operate the notebook computer in its projection viewing mode, the user must mechanically reconfigure the notebook computer by physically removing the prior art backlighting panel in order to reveal the active matrix LCD panel, and provide an optically clear path for the light rays to pass therethrough.

While the above-described notebook computer provides both direct and projection viewing modes, it suffers from a number of serious shortcomings and drawbacks which make it less than commercially attractive.

In particular, the light guiding panel in the prior art backlighting panel has permanently formed light diffusing surfaces, and thus must be physically removed to permit externally projected light to pass onto the active-matrix LCD panel without diffusion during its projection viewing mode of operation. The need to physically remove the entire backlighting panel from the Cruiser computer during its projection viewing mode, has made it virtually essential to fit the backlighting panel loosely against the LCD panel during the direct viewing mode. This design requirement necessarily compromises the "optical coupling" between the backlighting panel and the LCD display panel when the system is operated in its direct viewing mode. Consequently, during the direct viewing mode of operation, images are dimly displayed on the LCD display panel of the Cruiser computer.

From a practical standpoint, the poor optical coupling efficiency in the display panel assembly of the Cruiser computer necessitates higher luminous output from its fluorescent tubes in order to illuminate the display panel to a particular intensity level. Regrettably, this requirement results in increased power consumption which is highly undesirable in practically all portable computing applications.

Thus, there is a great need in the art for an improved backlighting panel construction that can be used in the illumination of optical transparencies, film structures, and the flat display panels of computer-based systems having direct and projection viewing modes.

OBJECTS OF THE PRESENT INVENTION

Accordingly, a primary object of the present invention is to provide a novel electro-optical backlighting panel construction for use in illuminating flat display panels, optical transparencies, film structures and the like.

A further object of the present invention is to provide such a backlighting panel for use with LCD panels in computer systems in order to provide a flat display panel having substantially improved performance during various graphics display functions, while avoiding the shortcomings and drawbacks of prior art backlighting and display techniques.

A further object of the present invention is to provide a flat panel display panel having direct and projection viewing modes of operation, and an electro-optical backlighting panel having a light emission state in which light is emitted from the electro-optical panel during the direct viewing mode of operation, and a light transmission state in which externally generated light is permitted to pass through the electro-optical panel without substantial scattering during the projection viewing mode of operation.

A further object of the present is to provide such a flat display panel assembly as described above, in which the light emission and transmission states of the electro-optical backlighting panel are electronically selectable during the first and second modes of operation, respectively.

A further object of the present invention is to provide a flat display panel as described above, in which the electro-optical backlighting panel is realized as a polymer dispersed liquid crystal (PDLC) panel assembly having a light-diffusive state of operation that is electronically selectable during the direct viewing mode, and also a light non-diffusive state of operation that is electronically selectable during the projection viewing mode of operation, without removal or other physical modification of the backlighting panel.

A further object of the present invention is to provide a flat display panel construction different from the display panel described above, in which the electro-optical backlighting panel is realized as a electroluminescent (EO) panel assembly having a layer of electroluminescent material that emits light from the panel during the direct viewing mode, and permits externally generated light to pass through the electro-luminescent panel during the projection viewing mode without substantial scattering.

A further object of the present invention is to provide a novel display panel construction particularly designed for use in portable computer-based systems having both direct and projection viewing modes of operation.

A further object of the present invention is to provide a novel computer-based system which incorporates such a display panel construction, and can be easily reconfigured for its projection viewing mode of operation without any sort of physical modification to the display panel assembly.

A further object of the present invention is to provide such a portable computer-based system with a housing having a light aperture that permits an external source of intense light to pass directly through the display panel assembly in order to project focused video images therefrom onto a desired viewing surface.

A further object of the present invention is to provide such a portable computer-based system with a hinged housing panel disposed behind the display panel assembly for supporting a light reflective panel and covering the light aperture when the system is operated in its direct viewing mode.

A further object of the present invention is to provide such a portable computer-based system, in which the display panel assembly further includes a Fresnel lens panel for use during the projection viewing mode.

A further object of the present invention is to provide such a portable computer-based system, in which a film slide or optical transparency carrying imagery can be placed upon the display surface of the display panel assembly of the present invention and the imagery viewed in either the direct or projection viewing mode.

A further object of the present invention is to provide a portable computer-based system having both direct and projection viewing modes of operation, in which "spatially-multiplexed" images of 3-D objects or imagery are viewable through an LCD display panel during the direct viewing mode, and viewable on a wall surface or projection screen during the projection viewing mode, so as to permit the 3-D object to be perceived with stereoscopic depth sensation when the spatially-multiplexed images are viewed through polarized viewing spectacles.

A further object of the present invention is to provide a portable image display system having both direct and projection viewing modes of operation so that it is capable of selectively displaying color video images on an actively driven display surface, such as an LCD display panel, or projecting such video images onto an electrically-passive viewing surface, such as a wall surface or projection screen.

A further object of the present invention is to provide a portable pen-computing device capable of supporting pen-based data entry operations and stereoscopic image display in both direct and projection viewing modes of operation.

A further object of the present invention is to provide a portable light projection accessory device that is particularly adapted for use with the portable computer-based systems of the present invention.

A further object of the present invention is to provide such a portable light projection device having first and second housing portions that are interconnected by a foldable structure that permits these housing portions to be selectively reconfigured for use during the projection viewing mode of operation, and for compact storage during the direct viewing mode of operation.

A further object of the present invention is to provide such a portable light projection device, wherein the first housing portion contains an intense light source and a light polarizing filter for producing an intense source of polarized light, and an optics assembly for projecting the produced polarized light, and wherein the second housing portion contains an image projection lens that can be adjustably positioned with respect to the display panel assembly thereof for projecting a focused video image onto a desired viewing surface.

A further object of the present invention is to provide a method of projecting images from such a portable computer-based system, by moving the rear housing panel away from the display panel assembly, positioning an external projection lens in front of the display panel assembly, electrically selecting the projection viewing mode of operation for the display assembly, and projecting an intense source of polarized light through the display panel assembly so that when the intense polarized light rays pass through the display panel assembly and are optically processed thereby and focused by the projection lens, a focused video image is projected onto a desired viewing surface.

An even further object of the present invention is to provide such a computer-based system in the form of either a palmtop, laptop or notebook computer, personal digital assistant or personal communicator which, with the portable light projecting device hereof, can be easily stored and transported in a lightweight carrying case having physical dimensions on the same order as the portable computer itself.

These and other objects of the present invention will become apparent hereinafter and in the Claims to Invention.

SUMMARY OF THE PRESENT INVENTION

In accordance with one of the broader aspects of the present invention, novel backlighting apparatus is provided for use in illuminating flat panel displays, optical transparencies, film structures and the like. In the illustrative embodiments, the backlighting apparatus is realized as a backlighting panel having direct and projection viewing modes of operation.

In general, the backlighting panel of the present invention comprises an electro-optical structure having a light emission state in which the electro-optical structure emits light, and a light transmission state in which the electro-optical structure is optically transparent and permits externally generated light to pass through the electro-optical structure without substantial scattering. In many embodiments, the electro-optical structure will be realized in the form of an electro-optical panel. In addition, the backlighting structure has first and second modes of operation and electronic circuitry for selecting the light emission state during the first mode of operation, and the light transmission state during the second mode of operation.

In general, the electro-optical backlighting panel construction of the present invention may be realized in a variety ways, using a variety of technologies, without departing from the scope or spirit of the present invention. Such technology may include, for example, the use of polymer-dispersed liquid crystal (PDLC) materials or electroluminescent (EO) materials, but of course is not limited to such electro-optical technologies.

According to one embodiment of the present invention, the backlighting panel comprises several integrated components, namely: a light producing means; a light guiding structure; a light diffusing structure, and a state selection means. The light guiding structure is formed from optically transparent material and has first and second light guiding surfaces and at least a first light conducting edge. The function of the light producing means is to produce visible light for transmission through the light conducting edge and internal reflection between the first and second light guiding surfaces. The light diffusing structure is operably associated with the light guiding structure, and has a light scattering (i.e. diffusing) optically transparent state of operation which is selectable during the direct viewing mode, and a light non-scattering optically transparent state of operation which is selectable during the projection viewing mode. The function of the state selection means is to select the light scattering state during the direct viewing mode, and the light nonscattering state during the projection viewing mode. In the preferred embodiments of the present invention, the state selection means is realized so as to enable electronic switching of the light diffusing structure from its light scattering state of operation, to its light non-scattering state of operation.

During the direct viewing mode, a light reflective surface is disposed adjacent the second light guiding surface of the light guiding structure, and the light producing means produces visible light for transmission through the light conducting edge and into the light guiding structure, wherein it is totally internally reflected between the first and second light guiding surfaces thereof. In the direct viewing mode, the state selection means electronically switches the light diffusing structure to its the light scattering state of operation. While operated in its light scattering state, the light diffusing structure scatters light rays internally reflected within the light guiding panel, and as such, a certain percentage of these scattered light rays are no longer satisfy the conditions for total internal reflection within the light guiding panel. Consequently, these scattered light rays are permitted to pass or leak through the first light guiding surface of the light guiding panel, and directly illuminate optical transparencies, film structures, flat LCD panels and the like.

During the projection viewing mode, the light reflective surface is not disposed adjacent the second light guiding surface of the light diffusing structure, and light is typically not produced from the light producing means. Rather, light is produced from an external light source and projected through the light guiding panel. Without physically removing the light diffusing structure from the light guiding panel, the state selection means electronically switches the light diffusing structure to its the light non-scattering state of operation. While operated in its light non-scattering state, the light diffusing structure permits the projected light rays to pass freely through the light guiding structure and light diffusing structure, without substantial scattering. Consequently, the projected light rays emerging from the backlighting panel can be used to illuminate optical transparencies, film structures, flat LCD panels and the like, and project images on large viewing surfaces.

In various illustrative embodiments, the light diffusing structure is based upon electro-optical structures having light scattering (i.e. diffusive) and light non-scattering (i.e. non-diffusive) states of operation which can be easily selected by the user under electronic control. The illustrative embodiments of the light diffusive structure are realized using first, second and third electro-optical light diffusing panels formed from polymer-dispersed liquid crystal material. It is understood, however, that more or less than three such light diffusive panels can be used in alternative embodiments.

In the illustrative embodiments, the first electro-optical light diffusing panel has first and second light transmission surfaces, a light scattering state of operation selectable during the direct viewing mode, and a light non-scattering state of operation selectable during the projection viewing mode. The first light transmission surface is in direct physical contact with the second light guiding surface of the light guiding structure. The second electro-optical light diffusing panel has third and fourth light transmission surfaces, a light scattering state of operation selectable during the direct viewing mode, and a light non-scattering state of operation selectable during the projection viewing mode. The third light transmission surface of the second electro-optical light diffusing panel is physically spaced apart from the second light transmission surface of the first electro-optical light diffusing panel, by a first ultra-thin air gap. The third electro-optical light diffusing panel has fifth and sixth light transmission surfaces, a light scattering state of operation selectable during the direct viewing mode, and a light non-scattering state of operation selectable during the projection mode. The sixth light transmission surface of the third electro-optical light diffusing panel is physically spaced apart from the second light guiding surface of the light guiding structure, by a second ultra-thin air gap.

When the backlighting panel of the present invention is used to construct a display subsystem having direct and projection viewing modes, switching the backlighting panel from its light diffusive state of operation to its light non-diffusive state of operation is accomplished electronically without having to physically remove or physically modify any component of the backlighting panel. Notably, the novel approach provided by the present invention is in marked contrast with prior art display systems which attempt to achieve the same functionalities by physically removing the backlighting panel from the LCD panel thereof, and consequently suffer from the above-described shortcomings and drawbacks.

In one illustrative embodiment, a novel flat graphics display panel is constructed by affixing the backlighting panel of the present invention to either a conventional passive or active matrix LCD panel. Preferably, a Fresnel lens structure is physically affixed to the third electro-optical light diffusing panel in order to project spatially modulated light onto large electrically-passive viewing surfaces, such as wall surfaces or projection screens, during the projection viewing mode.

In another illustrative embodiment, a novel stereoscopic viewing panel is provided by affixing a micropolarization panel to the display surface of the novel graphics display panel of the present invention. The stereoscopic viewing panel can be used in either direct or projection viewing modes of operation.

In yet another illustrative embodiment, a novel writing/display panel is provided by affixing a conventional pressure-sensitive electro-optical writing panel to the display surface of the novel graphics display panel of the present invention.

The numerous advantages derived using the backlighting panel of the present invention will become apparent hereinafter.

BRIEF DESCRIPTION OF THE DRAWINGS

For a more complete understanding of the present invention, the Detailed Description of the Illustrative Embodiments of the Present Invention is to be read in conjunction with the following drawings, in which:

FIG. 12B is a perspective view of the image display device of FIG. 12, shown interfaced with a conventional computer system while being operated in its projection viewing mode;

DETAILED DESCRIPTION OF THE ILLUSTRATIVE EMBODIMENTS OF THE PRESENT INVENTION

Figure 1:
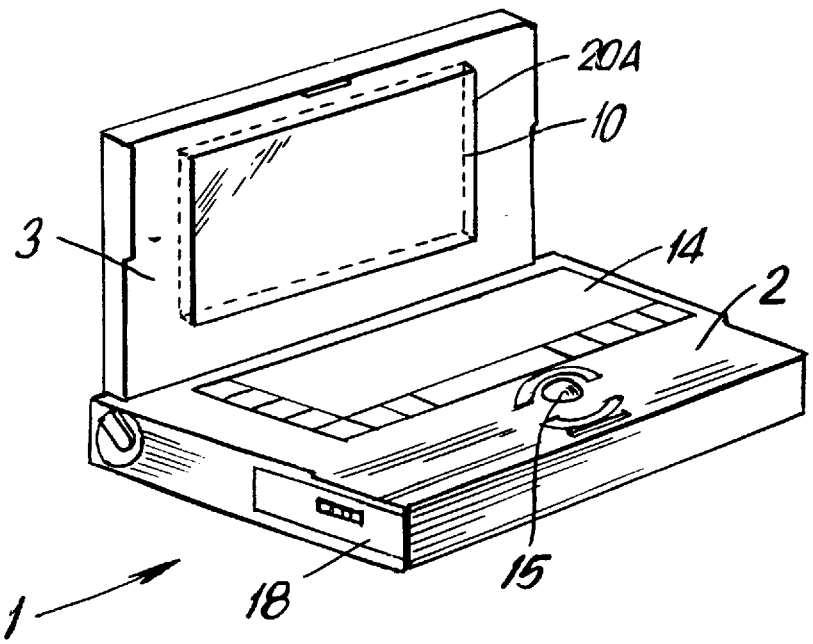
FIG. 1 is a first perspective view of the portable computer system of the first illustrative embodiment of the present invention, shown arranged in its direct viewing configuration.

As will be described below, the electro-optical backlighting panel of the present invention can be used in various backlighting environments. For purpose of illustration, the backlighting panel of the present invention is shown incorporated as a component in various portable computer-based systems, namely: the portable notebook/laptop computer illustrated in FIGS. 1 to 5C; the portable notebook/laptop computer illustrated in FIGS. 9 to 11C; the portable image display device illustrated in FIGS. 12 to 12 E; and the portable pen-computing device illustrated in FIGS. 13 to 13B. It is understood, however, that the backlighting panel of the present invention may be used with other types of computer-based systems and equipment, including computer monitors, optical transparencies, film structures and the like, without departing from the scope and spirit of the present invention.

In general, the backlighting panel of the present invention comprises an electro-optical structure having a light emission state in which light is emitted therefrom, and a light transmission state which permits the electro-optical structure to pass externally generated light therethrough without substantial scattering. In many embodiments, the electro-optical structure will be realized in the form of a thin electro-optical panel having first and second modes of operation. Electronic circuitry is provided for selecting the light emission state during the first mode of operation, and the light transmission state during the second mode of operation. The electro-optical backlighting panel is particularly suited for use in various applications where backlighting illumination is required or desired.

In general, the electro-optical backlighting panel of the present invention may be realized in a variety ways, using a variety of technologies, without departing from the scope or spirit of the present invention. Such technology may include, for example, the use of polymer-dispersed liquid crystal (PDLC) or electroluminescent (EO) materials, but of course is not limited to such electro-optical technologies.

In accordance with one embodiment of the present invention, the backlighting panel is realized by integrating several components, namely: a light producing means; a light guiding structure; a light diffusing structure, and a state selection means. The light guiding structure is formed from optically transparent material and has first and second light guiding surfaces and at least a first light conducting edge. The function of the light producing means is to produce visible light for transmission through the light conducting edge and internal reflection between the first and second light guiding surfaces. The light guiding structure. The light diffusing structure is operably associated with the light guiding structure, and has a light scattering (i.e. diffusing) optically transparent state of operation which is selectable during the direct viewing mode, and a light non-scattering optically transparent state of operation which is selectable during the projection viewing mode. In this particular embodiment, the function of the state selection means is to select the light scattering state during the direct viewing mode, and the light non-scattering state during the projection viewing mode. In the preferred embodiments of the present invention, the state selection means is realized so as to enable electronic switching of the light diffusing structure from its light scattering state of operation, to its light non-scattering state of operation.

During the direct viewing mode, a light reflective surface is disposed adjacent the second light guiding surface of the light guiding structure, and the light producing means produces visible light for transmission through the light conducting edge and into the light guiding structure, wherein it is totally internally reflected between the first and second light guiding surfaces thereof. In the direct viewing mode, the state selection means electronically switches the light diffusing structure to its the light scattering state of operation. While operated in its light scattering state, the light diffusing structure scatters light rays internally reflected within the light guiding panel, and as such, a certain percentage of these scattered light rays are no longer satisfy the conditions for total internal reflection within the light guiding panel. Consequently, these scattered light rays are permitted to pass or leak through the first light guiding surface of the light guiding panel, and direct illuminate optical transparencies, film structures, flat LCD panels and the like.

During the projection viewing mode, the light reflective surface is not disposed adjacent the second light guiding surface of the light diffusing structure, and light is typically not produced from the light producing means. Rather, light is produced from an external light source and projected through the light guiding panel. Without physically removing the light diffusing structure from the light guiding panel, the state selection means electronically switches the light diffusing structure to its the light non-scattering state of operation. While operated in its light non-scattering state, the light diffusing structure permits the projected light rays to pass freely through the light guiding structure and light diffusing structure, without substantial scattering. Consequently, the projected light rays emerging from the backlighting panel can be used to illuminate optical transparencies, film structures, flat LCD panels and the like, and project images on large viewing surfaces.

Alternatively, the electro-optical backlighting panel of the present invention can be realized as a electroluminescent (EO) panel assembly having a layer of electroluminescent material that emits light from the panel during the direct viewing mode, and permits externally generated light to pass through the electroluminescent panel during the projection viewing mode without substantial scattering. With this alternative method of construction, a special choice of electroluminescent materials, rather than PDLC materials, are used to achieve the light emission and transmission states of the electro-optical backlighting panel.

In general, the backlighting panel of the present invention can be used in many different applications requiring illumination of optical transparencies, film structures, flat LCD panels and the like. However, for purposes of illustration only, backlighting panel of the present invention will be described in great detail with reference to several computer-based embodiments described below. Throughout the drawings, like figures shall be indicated with like reference numbers.

Figure 1A:
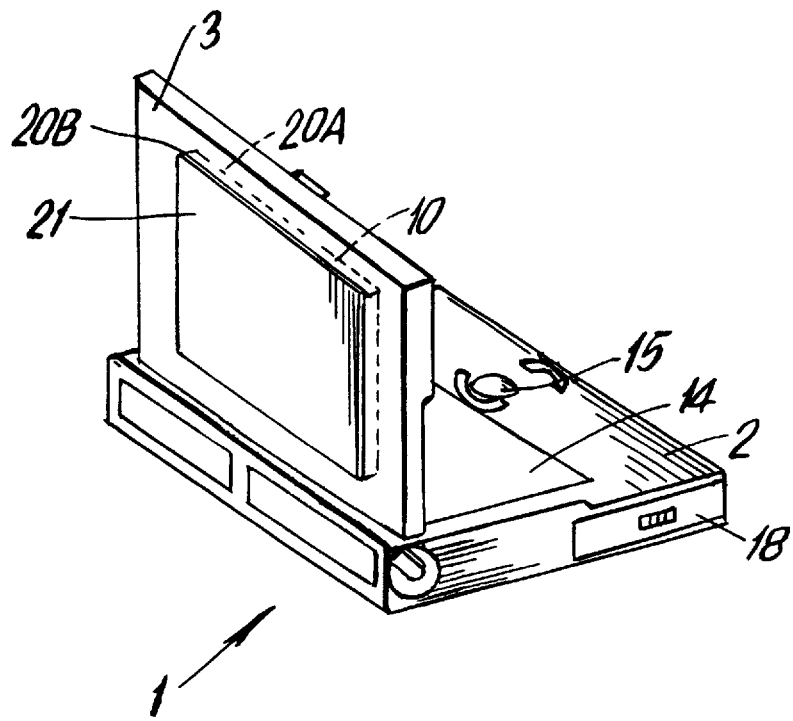
FIG. 1A is a second perspective view of the portable computer-based system of FIG. 1, shown arranged in its direct viewing configuration.
Figure 2:
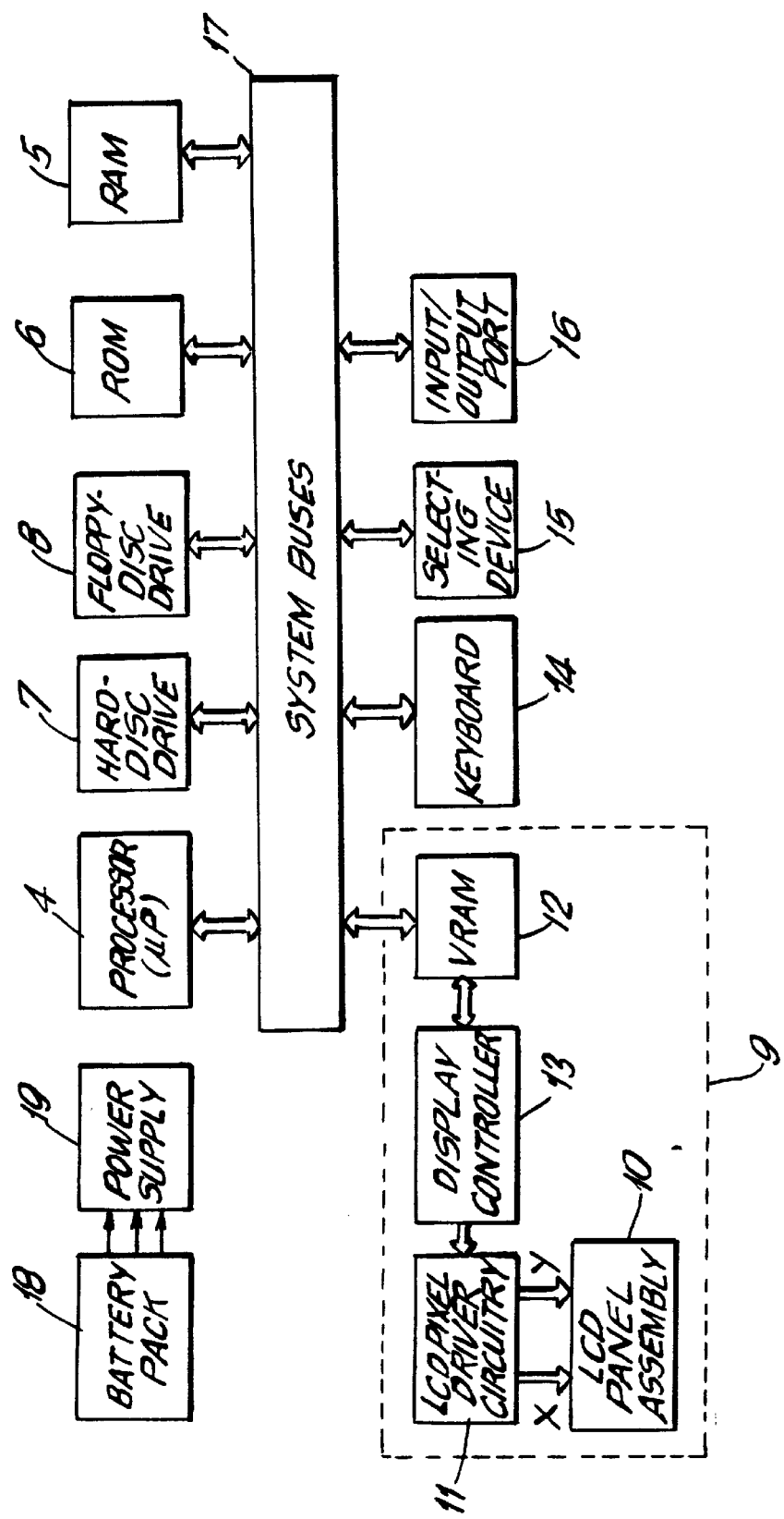
FIG. 2 is a block system diagram of the portable computer system shown in FIGS. 1 and 1A.

As shown in FIGS. 1 and 1A, portable computer system 1 includes a housing having a base portion 2 and a hingedly connected display (or cover) portion 3. As illustrated in FIG. 2, portable computer system 1 comprises a number of integrated system components, namely: one or more central processing units 4 (e.g. microprocessors); high-speed random access memory storage device (e.g. RAM) 5 for storing system parameters, operating system routines, application programs, and the like during execution; a high-speed read only memory device (e.g. ROM) 6 for storing portions of an operating system program; a hard-disc drive subsystem 7 for reading and writing onto hard-type magnetic or opto-magnetic discs, information files, programs, image data and the like for long term storage; a floppy-disc drive subsystem 8 for reading and writing onto floppy-type magnetic discs, information files, programs, image data and the like for long term storage; a visual display subsystem 9 including a LCD display panel assembly 10 and X and Y driver circuitry 11 shown in FIGS. 3 and 3A; a video image storage subsystem including a video random access memory device (e.g., VRAM) 12 for buffering frames of video data to be displayed on the display panel assembly, and a display processor 13 for accessing frames of video data stored in VRAM 12 and providing these video frames to the X and Y driver circuitry 11; a keyboard or other text input device 14 and associated interface circuitry; a pointing and selecting device (e.g. mouse or track-ball) 15 and interface circuitry and an external input/output port 16 for interfacing one or more input or output devices, such as CD-ROM (optical disc) player, stereo-video camera, facsimile unit, and the like. As illustrated, each of these system components is operably associated with processor(s) 4 by way of one or more system buses 17 in a manner known in the art. In addition, the computer system also includes a rechargeable battery pack 18 and power distribution circuitry 19 well known in the portable computing art.

In the preferred embodiment, the operating system may be realized by Macintosh® System 7.0 operating system software from Apple Computer, Inc., Windows® operating system software from Microsoft Corporation, or Unix® X-Windows operating system software from AT&T, allowing the processors to support a plurality of input/output windows, pointing and selecting device 15, and multi-media input and output devices. It is understood, however, that other suitable operating system programs can be used with acceptable results without departing from the scope and spirit of the present invention.

In the first illustrative embodiment of the computer-based system, all of the above-described system components, except for display panel assembly 10, are contained in the base portion of the computer housing shown in FIGS. 1 and 1A, and only display panel assembly 10 is mounted within the hinged cover portion of the housing. It is understood, however, the particular distribution of system components will vary from embodiment to embodiment of the present invention.

Figure 4:
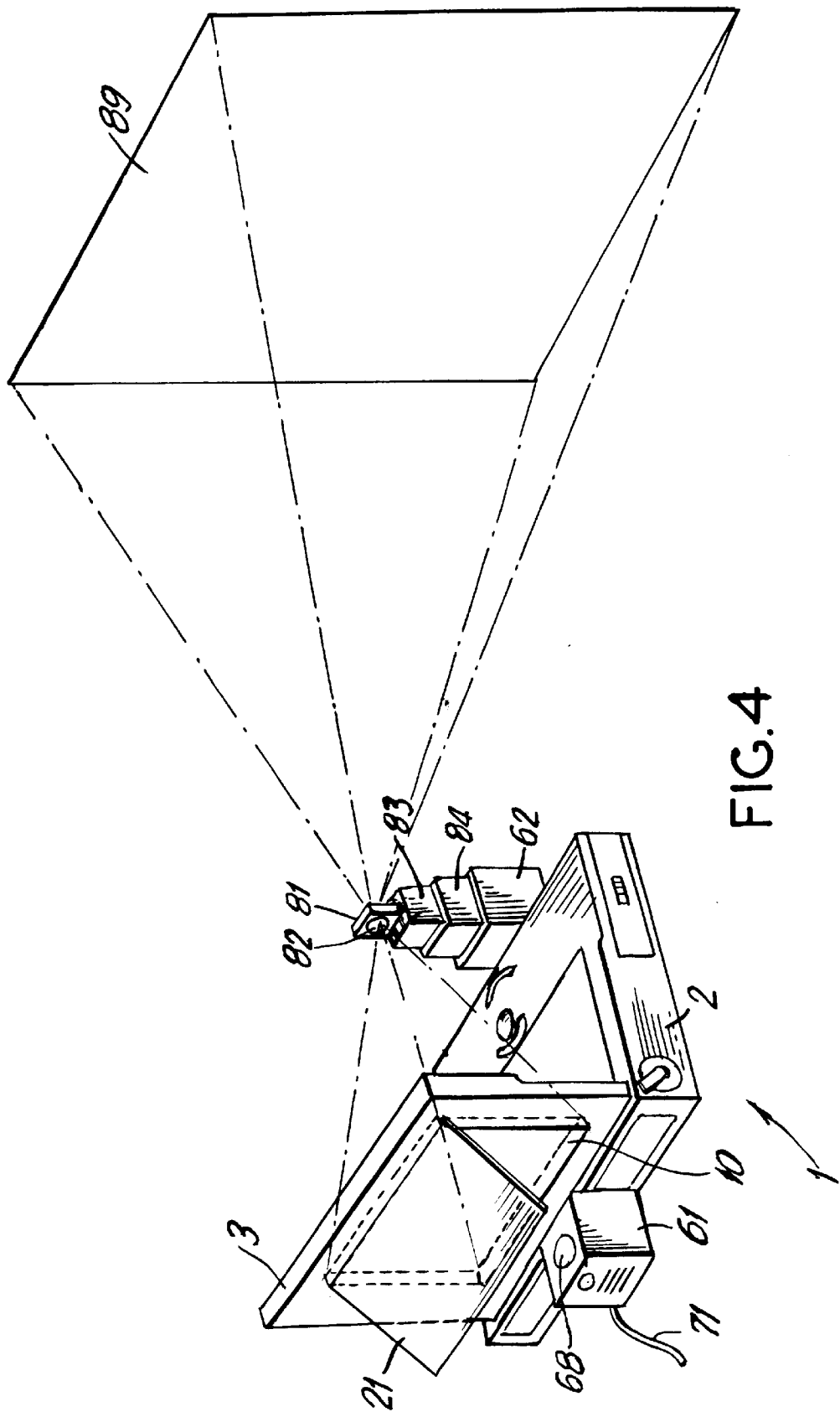
FIG. 4 is a perspective view of the portable computer-based system of the first illustrative embodiment, shown arranged in its projection viewing configuration.

As shown in FIGS. 1 and 1A, both the front and rear sides of cover 3 have an rectangular light transmission apertures 20A and 20B formed therethrough. The size of these apertures are substantially the same, yet slightly smaller in length and width dimensions than display panel assembly 10 of the present invention in order to support the perimetrical edges of the display panel assembly in a conventional manner known in the art. In the first illustrative embodiment, an optically opaque rear panel 21 is hingedly connected to the rear portion of the cover so as to completely close off light transmission aperture 20B when panel 21 is rotated downwardly into its direct viewing configuration shown in FIG. 1A. When rotated upwardly in order to arranged the portable computer into its projection viewing configuration as shown in FIG. 4, rear panel 21 is held in position at a 45 degree angle with respect to the plane of display panel assembly 10. The dimensions of rear panel 21 are slightly smaller than the dimensions of the rear aperture 20B.

Figure 3:
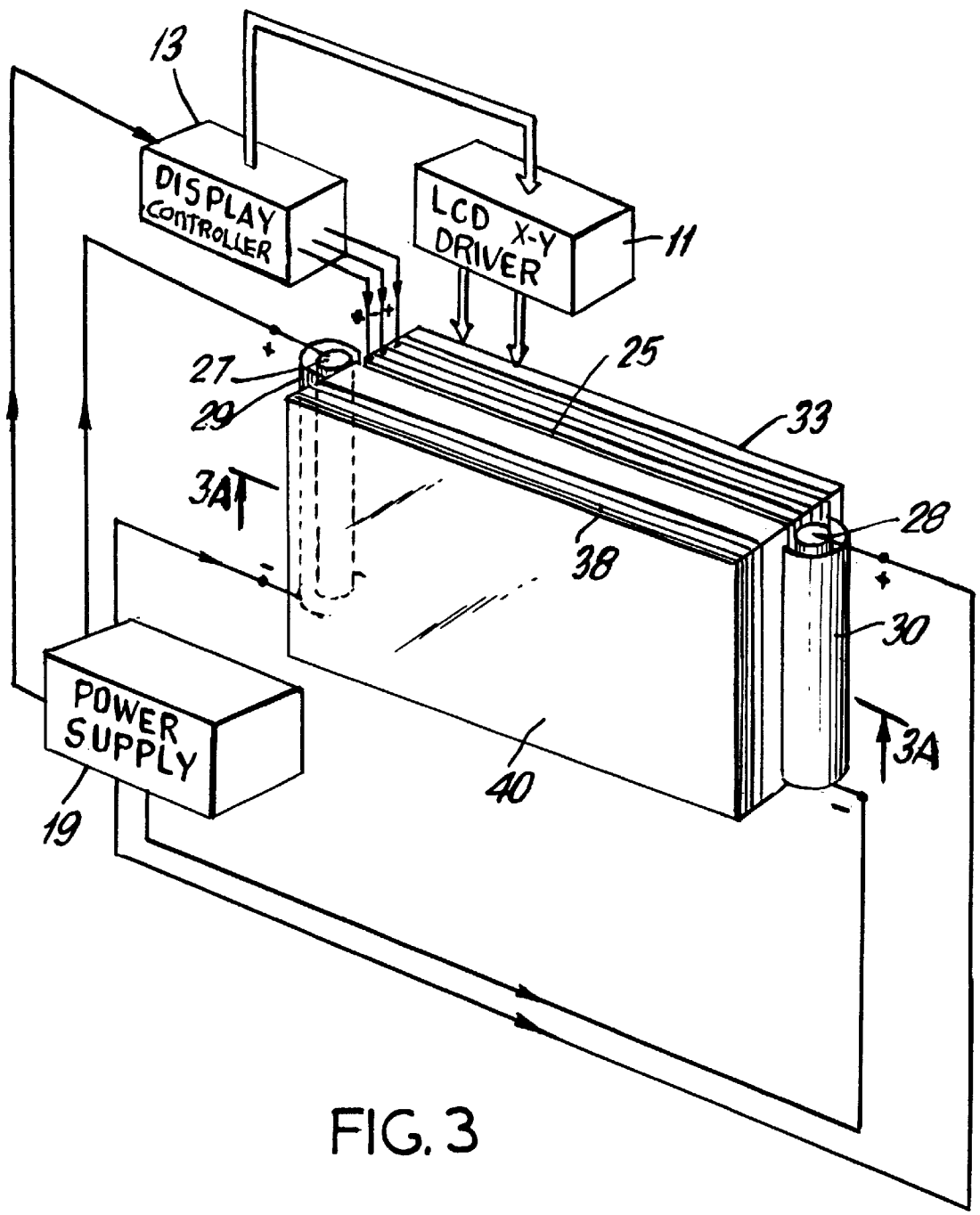
FIG. 3 is a schematic representation of the image display subsystem of the portable computer system of the first illustrative embodiment, shown in its direct viewing configuration.
Figure 3A:
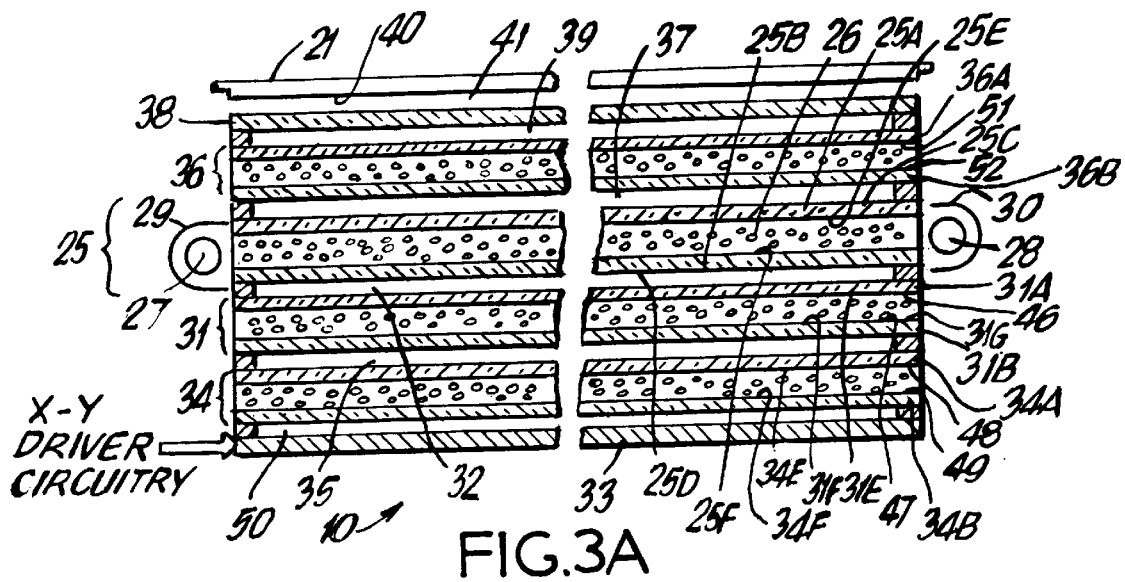
FIG. 3A is a cross-sectional view of the display panel assembly of the first illustrative embodiment, taken along line 3A—3A of FIG. 3, showing the electro-optical light diffusing panels thereof being constructed in accordance with a first manufacturing technique.

As shown in the direct viewing configuration of FIGS. 3 and 3A, display panel assembly 10 is constructed by integrating a first illustrative embodiment of the electro-optical backlighting panel of the present invention with a programmable spatial light modulator(SLM), realized as a conventional LCD panel 33. As illustrated in these drawings, the first illustrative embodiment of the backlighting panel comprises a number of subcomponents, namely: a light guiding structure 25 in the form of a first polymer dispersed liquid crystal (PDLC) panel (25) consisting of a pair of spaced apart, optically transparent panels 25A and 25B having exteriorly disposed light guiding surfaces 25C and 25D and interiorly disposed surfaces 25E and 25F, a uniformly thick layer of polymer-dispersed liquid crystal material 26 deposited between panels 25A and 25B; a pair of fluorescent lighting tubes 27 and 28 electrically connected to power supply 19 and controlled by processor 4; elongated concave light reflectors 29 and 30; a second PDLC panel 31 affixed to the front surface of light guiding structure 25 with an ultra-thin air gap 32 disposed therebetween; a third PDLC panel 34 affixed to the rear surface of second PDLC panel 31 with an ultra-thin air gap 35 therebetween; a fourth PDLC panel 36 affixed to the rear surface of light guiding structure 25 with an ultra-thin air gap 37 therebetween; and a Fresnel lens zone structure formed in a thin optically transparent layer 38 directed laminated onto the rear surface of the fourth PDLC panel 36, with an ultra-thin air gap 39 therebetween. Together, panels 25, 31, 34, 36 and 38 form the electro-optical backlighting panel of the first illustrative embodiment. As shown in FIG. 3A, active-matrix LCD display panel 33 is affixed to the rear surface of the front surface of second PDLC panel 34 with an ultra-thin air gap 50 disposed therebetween. As such, panels 25, 31, 33, 34, 36 and 38 are integrally connected together to form as a single composite structure, display panel assembly 10. In the preferred embodiment, the overall thickness of this composite structure is less than 10 millimeters. Ultra-thin air gaps 32, 35, 37, 39 and 50 can be formed by very thin panel spacers realized as dimples formed in respective panels or any other suitable techniques known in the art.

While PDLC material is used in the illustrative embodiment to form the light diffusive structure of the present invention, it is understood that other suitable electro-optical structures, having switchable light scattering and non-light scattering states of operation, may be used.

As shown in FIGS. 3 and 3A, a reflective layer 40 is applied to the inner surface of rear panel 21, which is hingedly connected to the computer display (or cover) portion. In the direct viewing mode, reflective layer 40 is disposed adjacent Fresnel lens panel 38 with an air gap 41 disposed therebetween, whereas reflective layer 40 and rear panel 21 are removed away from display panel assembly 10 during the projection viewing mode shown in FIGS. 5 and 5C.

In the first illustrative embodiment, light guiding structure 25 has a thickness in the range of from about 1 to about 5 millimeters. Fluorescent lighting tubes 27 and 28 are driven by power supply 19 and supported in miniature fixtures well known in the art. The lighting tubes are closely positioned along and in close proximity with opposing side edges of light guiding structure 25. Light rays emitted from these lighting tubes are focused by reflectors 28 and 29 along the side edges of the light guiding structure, and effectively conducted into the interior of the light guiding structure so that they are normally bounded (i.e. internally reflected) between light guiding surfaces 25A and 25B in accordance with the well known optical principle of "total internal reflection".

Particularly during the direct viewing mode of operation, it is necessary that the light trapped within the light guiding structure be uniformly extracted or "leaked out" in the direction of the LCD panel 33. By doing so, only LCD panel 33 is allowed to spatially modulate (and spectrally filter) the light intensity distribution produced from the backlighting panel and display color imagery. In accordance with the present invention, this function is performed by electrically-controlling the first PDLC panel 25 (i.e. light guiding structure) so that it interrupts the total internal reflection of the light guided between the light guiding surfaces 25C and 25D of the light guiding structure. In the illustrative embodiment, this function is realized by coating the opposing interior surfaces 25E and 25F of optically transparent panels 25A and 25B with optically transparent electrically-conductive layers 42 and 43 (e.g. Indium Tin Oxide) having ultra-thin dimensions (e.g. 1000 to 5000 Angstroms ). As best shown in FIG. 3C, PDLC layer 26 is disposed between these electrically-conductive layers. Importantly, specific optical materials are selected so that optically transparent panels 25A and 25B and cured polymer matrix 44 therebetween (suspending liquid crystal molecules 45) have identical indices of refraction.

As best shown in FIG. 3C, during the direct viewing mode, no external electric field (i.e. voltage) is applied across electrode surfaces 42 and 43. Under such conditions, the electric field vectors of polymer-dispersed liquid crystals 45 between electrode surfaces 42 and 42 are randomly oriented and light rays reflected between light guiding surfaces 25C and 25D are scattered in accordance with the well known Lambertian distribution. Those scattered light rays no longer satisfying the critical angle for total internal reflection are transmitted directly through both light guiding surfaces 25C and 25D.

Figure 5:
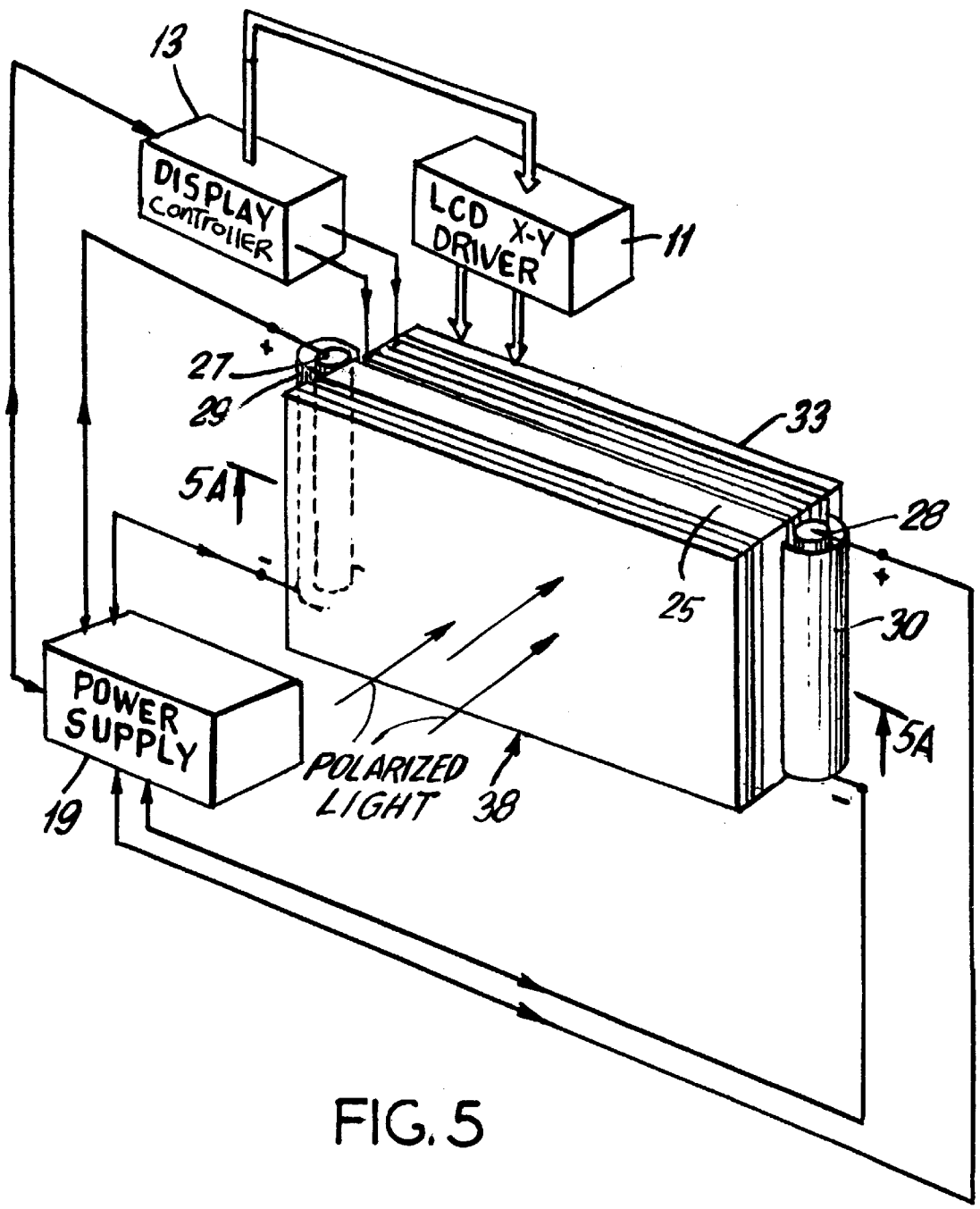
FIG. 5 is a schematic representation of the image display subsystem of the portable computer system of the first illustrative embodiment, shown in its projection viewing configuration.
Figure 5A:
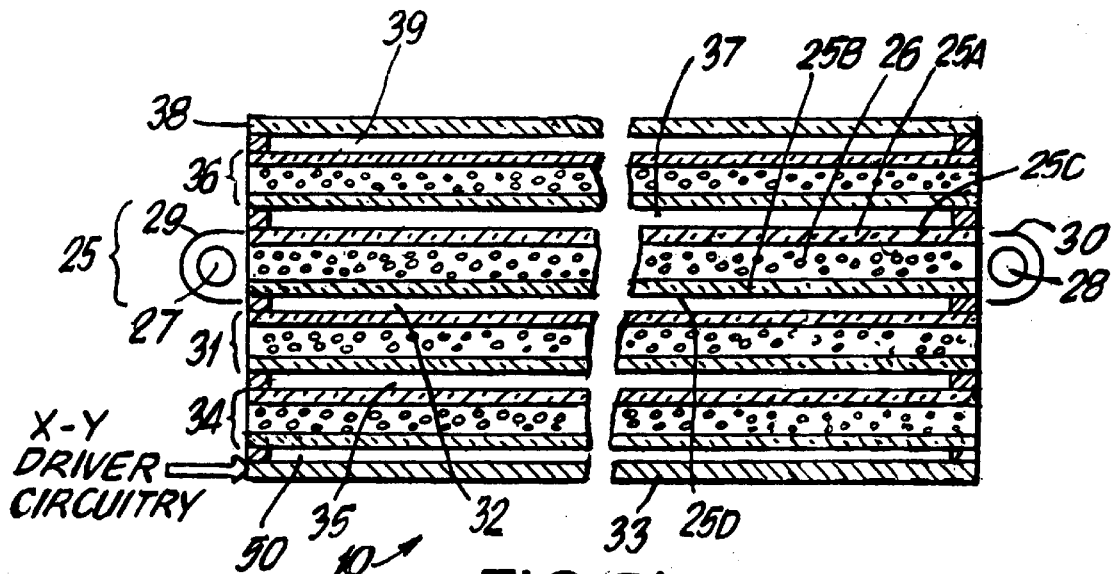
FIG. 5A is a cross-sectional view of the image display panel assembly of the first illustrative embodiment, taken along line 5A—5A of FIG. 5, showing the electro-optical light diffusing panels thereof being constructed in accordance with a first manufacturing technique of the present invention.
Figure 5B:
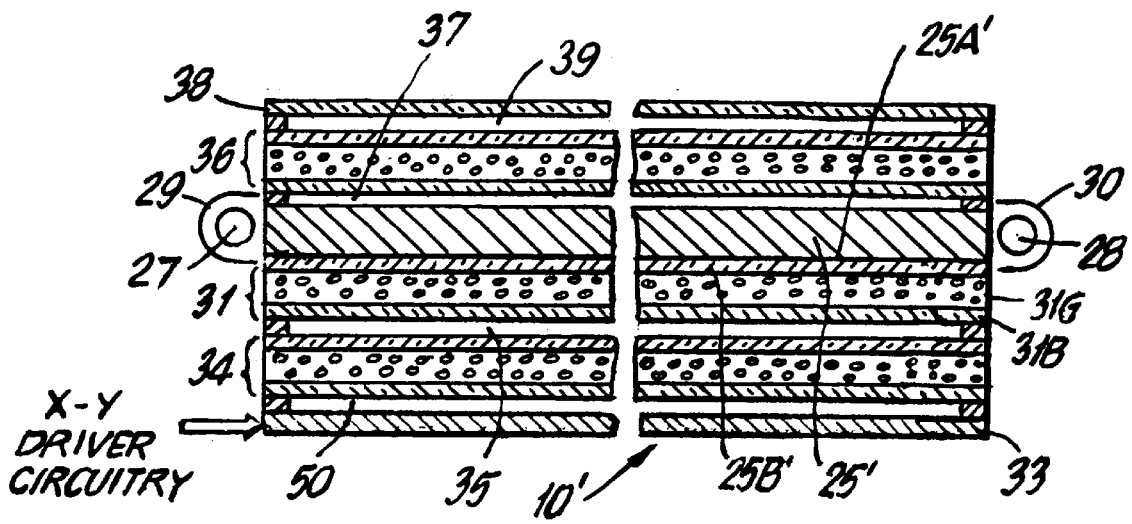
FIG. 5B is a cross-sectional view of the display panel assembly of the second illustrative embodiment, taken along line 5B—5B of FIG. 5, showing the electro-optical light diffusing panels thereof being constructed in accordance with a second manufacturing technique of the present invention.
Figure 5C:
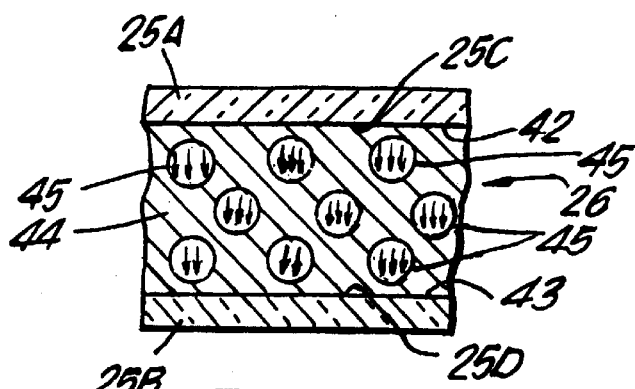
FIG. 5C is an enlarged, cross-sectional view of a portion of an electro-optical light diffusing panel in the display panel assembly of FIG. 5, shown during the projection viewing mode.

As shown in FIG. 5C, during the projection mode an external field (i.e. voltage) is applied across electrode surfaces 42 and 43 causing the PDLC molecules to align in the direction of the electric field, perpendicular to the light guiding surfaces 25C and 25D, and thereby eliminates light scattering. During this mode of operation, the PDLC panel assumes its light non-scattering state so that the condition of total internal reflection is satisfied, with substantially no light leaking from the light guiding structure. Only externally generated light rays, propagating substantially perpendicular to the light guiding surfaces of the light guiding structure, are permitted to pass completely through the backlighting panel onto LCD panel 33. To switch the display system to its direct viewing mode, all that is required is to remove the voltage (i.e. external field) applied across electrode surfaces 42 and 43, causing PDLC panel 26 to revert back to its light scattering (i.e. diffusive) state of operation.

In order to ensure that the light leaked out through the front surface of the light guiding panel 25 is substantially uniform, it is necessary to compensate for the inherent decrease in conducted light intensity in the direction of the central axis of the light conductive panel. In the illustrative embodiments of the present invention, this compensation function can be achieved using any one of the techniques described below.

A first method of light intensity compensation involves distributing the liquid crystal molecules within the PDLC 26 as a function of distance across the horizontal dimensions of the light guiding panel. Specifically, in the dual fluorescent tube configuration of the first illustrative embodiment, the density of liquid crystals is made to be greater towards the center of the light guiding panel 25 where the intensity of conducted light is least. By doing so, compensation for diminishing light intensity can be achieved. This technique can be carried out by preparing an emulsion of PDLC material formed from polyvinyl acetate (PVA), polymethyl methacrylate (PMMA) or other suitable polymer material, all well known in the art. Then liquid crystal molecules are added to the emulsion. Using the prepared emulsion and screen printing techniques well known in the art, a pattern of PDLC emulsion material is formed on optically transparent electrode surface 42 or 43. Notably, the geometry of the PDLC emulsion pattern will be selected with consideration to light intensity compensation across the backlighting panel. Thereafter during PDLC film formation, microdroplets are formed spontaneously in the resulting PDLC film using a phase separation process. The phase separation can be induced by polymerization, temperature, or a combination of solvent and temperature. In particular, a phase-separation technique, such as Polymerization-Induced Phase Separation(PIPS), Thermally-Induced Phase Separation (TIPS) or Solvent-Induced Phase Separation can be used to form liquid crystal microdroplets dispersed in the PDLC film structure. The PDLC film is fixed (i.e. cured) using UV radiation with photo-initiators, both well known in the art. Finally, a layer of PVA or PMMA is applied over the fixed patterned PDLC film layer in order to fill-in the gaps between the pattern and form an optically smooth surface.

When the light guiding structure 25 is completely fabricated, there should be complete index refraction matching from light guiding surface 25C to light guiding surface 25D. While this optical condition must be satisfied to ensure optimal performance of the light guiding structure, it is understood that the choice of materials and fabrication techniques used to realize this structure may vary from embodiment to embodiment.

Figure 3B:
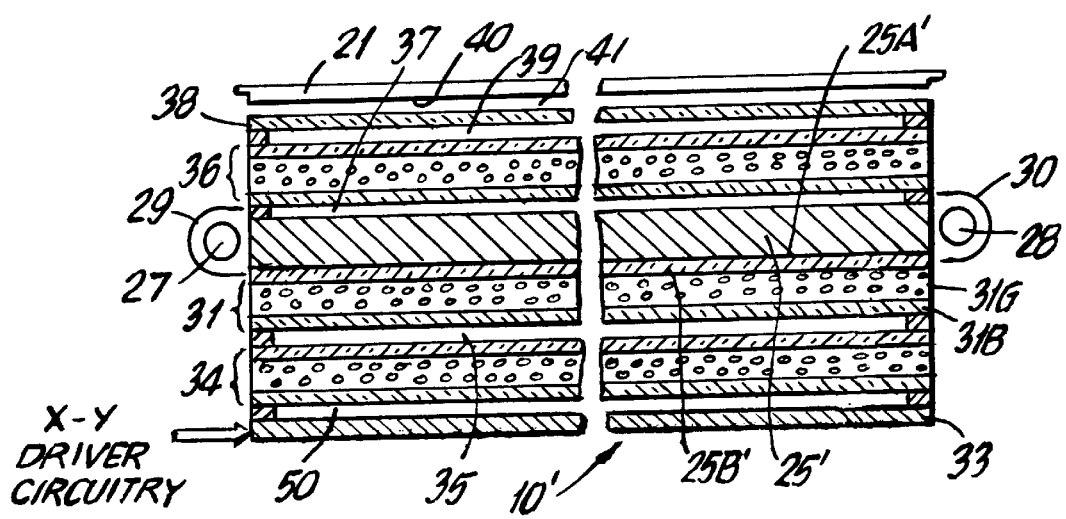
FIG. 3B is a cross-sectional view of the display panel assembly of the second illustrative embodiment, taken along line 3B—3B of FIG. 3, showing the electro-optical light diffusing panels thereof being constructed in accordance with a second manufacturing technique.
Figure 3C:
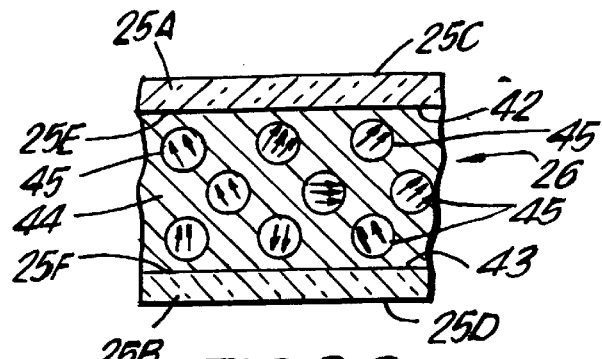
FIG. 3C is an enlarged cross-sectional view of a portion of an electro-optical light diffusing panel in the display panel assembly of FIG. 3, shown during the direct viewing mode.
Figure 3D:
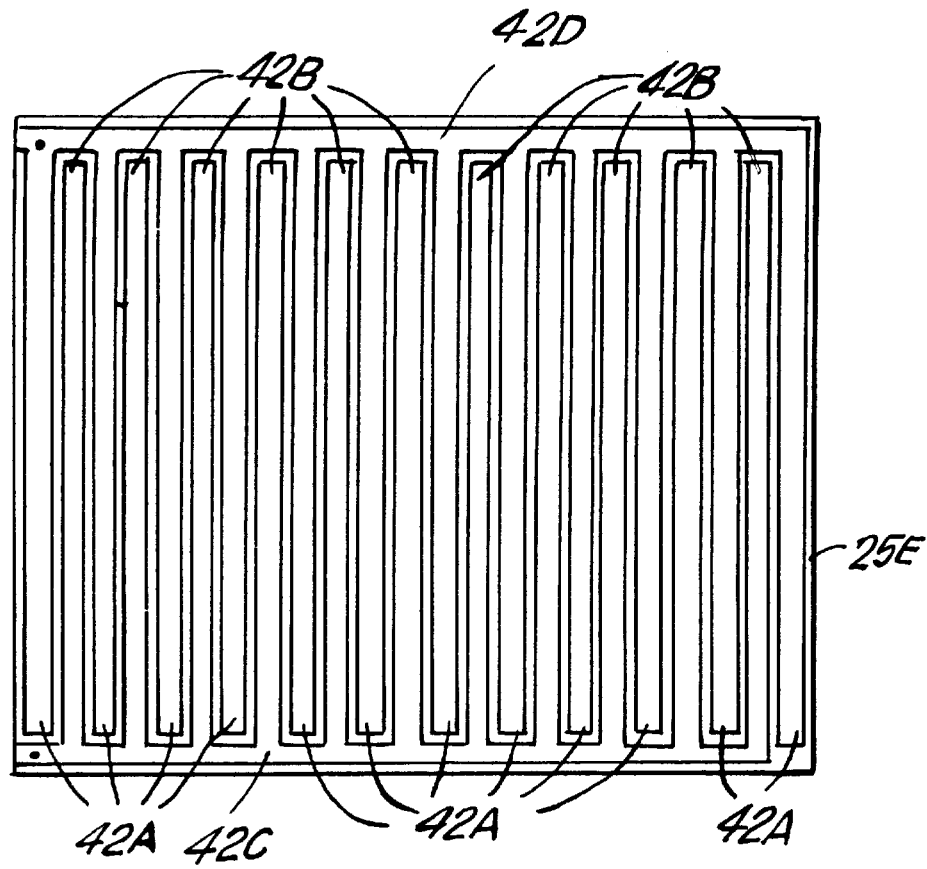
FIG. 3D is a schematic representation of an electrode pattern formed on one of the surfaces of the light guiding structure of the display panel assembly of FIGS. 3A or 3B in order to achieve light intensity compensation thereacross during the direct viewing mode.
Figure 3E:
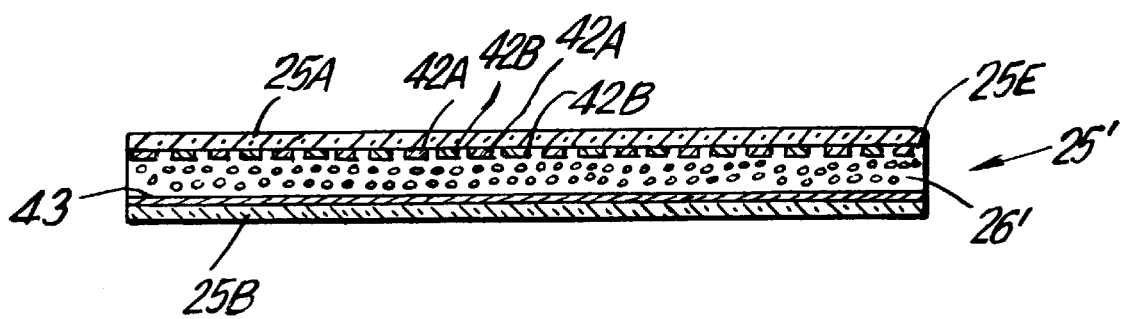
FIG. 3E is a cross-sectional view of the light guiding structure employing the electrode pattern of FIG. 3D.

A second method of light intensity compensation illustrated in FIGS. 3D and 3E involves forming (i) primary and secondary sets of interleaved (optically-transparent) electrode strips 42A and 42B on the interiorly disposed surface 25E of optically transparent panel 25A, and (ii) a uniform optically transparent electrode surface 43 on the interiorly disposed surface 25F of optically transparent panel 25B. As shown in FIGS. 3D and 3E, electrode strips 42A and 42B extend parallel to the vertical direction of light guiding structure 25. Electrode strips 42A are electrically connected to a bus strip 42C, whereas electrode strips 42B are electrically connected to bus strip 42D. As shown in FIG. 3D, an unpatterned uniform PDLC layer 26' is formed between these electrode surface structures. In order to cause greater light scattering towards the central region of the light guiding structure and thus compensate for light intensity in this region, the width of the interleaved electrode strips 42A and 42B increases a towards the center of the light guiding structure, as shown. In general, the width of the gap between adjacent electrode strips is substantially smaller than the width of the electrode strips. This ensures that during the projection viewing mode, when an external electric field is applied across both the primary and secondary sets of electrode strips and all liquid crystal molecules align therewith and pose no light scattering in this state of operation perturbations in the electric field intensity is negligible at the fringe areas of the electrode surfaces. Also, the thickness of the PDLC layer 26 is made substantially smaller than the width of the narrowest electric strip to ensure that the electric field between the electrode strip and the ground electrode surface is substantially uniform.

In the direct viewing mode, it is essential that light internally reflected between light guiding surfaces 25C and 25D is permitted to escape or leak out towards LCD panel 33. During the direct viewing mode, internally reflected light is permitted to escape light guiding structure by applying an external field only across the secondary set of electrode strips 42B. In response, the electric field vectors of the liquid crystal molecules below the secondary set of electrode strips 42B, are randomly oriented and a pattern of non-scattering liquid crystal molecules are formed. Between the primary set of electrode strips 42A and the uniform electrode surface 43, across which no electric field is applied, the electric field vectors of the liquid crystal molecules are randomly oriented and light scattering occurs. Naturally, during the direct viewing mode, a greater degree of light scattering occurs under the wider electrode strips of the primary set of electrodes 42A, than under the narrower electrode strips in the primary set. Collectively, the resulting light scattering pattern so formed provides the degree of light intensity compensation required for high quality imaging through LCD panel 33.

Figure 3F:
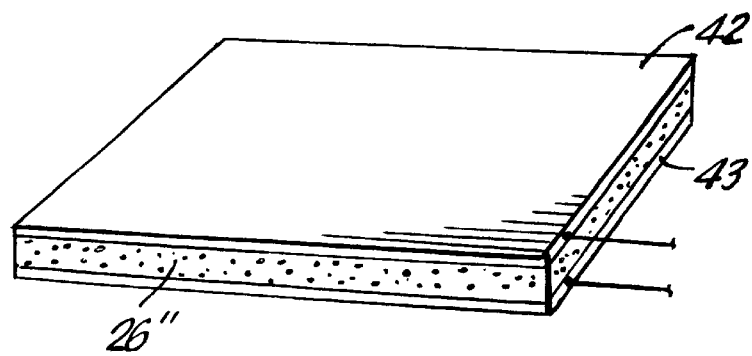
FIG. 3F is a perspective view of a uniform layer of PDLC film disposed between a pair of unpatterned optically transparent electrode layers during the first step of making a light intensity compensated PDLC panel in accordance with the present invention.
Figure 3G:
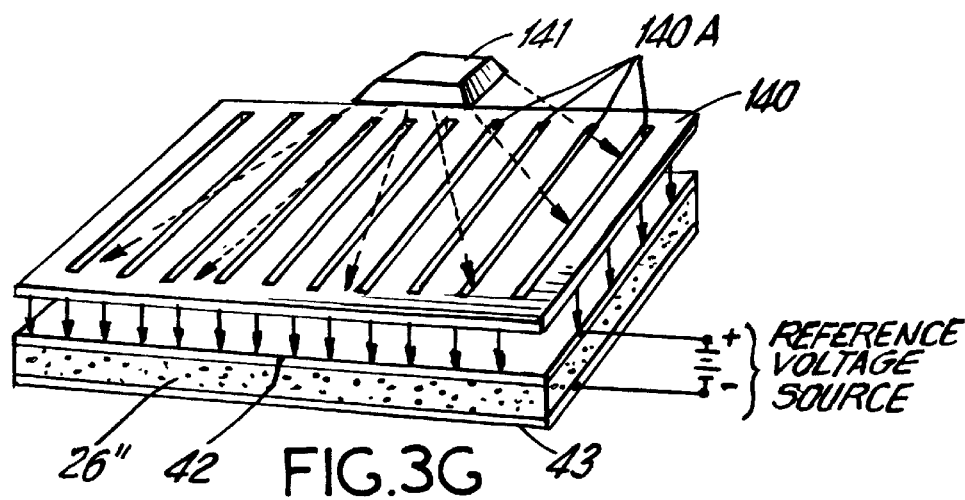
FIG. 3G is a perspective view of the PDLC film structure of FIG. 3F shown being exposed to a pattern of ultraviolet (UV) light projected using UV light projector with a spatial mask, while a "reference" electric field, directed substantially perpendicular to the plane of the PDLC film structure, is applied across the optically transparent electrode layers in order to align the optical axis of each liquid crystal microdroplet parallel therewith.
Figure 3H:
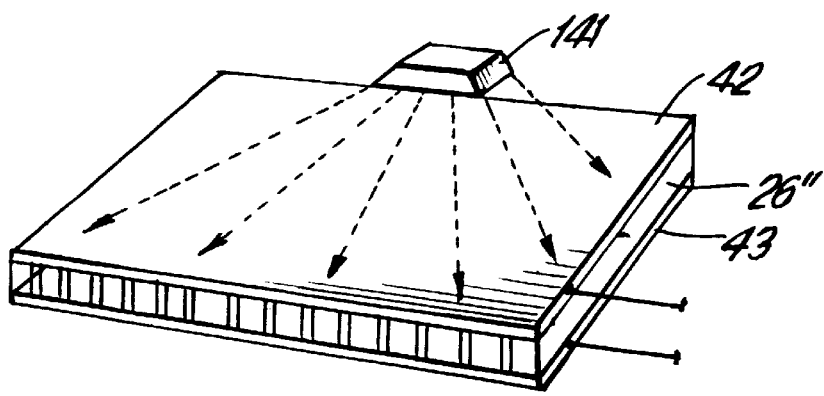
FIG. 3H is a perspective view of the PDLC film structure of FIG. 3G, shown being exposed to UV light using a UV light projector (without a spatial mask) while the reference electric field is removed.

A third method of light intensity compensation is illustrated in the drawings of FIGS. 3F to 3H. As shown in FIG. 3F, the first step of the method involves providing a uniform layer of PDLC film 26' between a pair of unpatterned optically transparent electrode layers 42 and 43. Typically, each optically transparent electrode layer is formed from a material such as Indium Tin Oxide. Preferably, PDLC film layer 26' consists of a distribution of encapsulated liquid crystal microdroplets (i.e. "liquid crystal microdroplets") with diameters of about 0.1 to about 10 microns, surrounded by or uniformly dispersed in a light transmissive matrix of photo-sensitive polymer, such as Norland 65 photopolymer, commercially available from Norland, Inc, of New Jersey.

At this stage of the manufacturing process, a suitable emulsion for the PDLC film must be prepared. In the illustrative embodiment, the first step in preparing the emulsion involves forming a homogeneous, fairly viscous solution formed by intermixing nematic, smectic or cholesteric liquid crystal molecules with appropriate liquid polymer precursors (e.g. prepolymer or monomer) and curing agent, such as liquid UV photo-initiator. Suitable materials for use in preparing the homogeneous solution are well known to those with ordinary skill in the art. Also well known details regarding PDLC film manufacture are disclosed in the paper "Polymer-Dispersed and Encapsulated Liquid Crystal Films" by G. Paul Montogomery, Jr., published in Large-Area Chromogenics: Materials and Devices for Transmittance Control, SPIE Institute Series Vol.IS 4, pages 577–606, incorporated herein by reference in its entirety. Once prepared, the viscous solution can be applied between a pair of substrates coated with optically transparent conducting electrode layers 42 and 43, to form a film emulsion structure of the required thickness. Typically, Indium Tin Oxide(ITO) is used to form optically transparent electrode layers 42 and 43.

In general, microdroplets in the PDLC film emulsion structure are formed spontaneously by a phase separation process which occurs during film formation. The phase separation can be induced by polymerization, temperature, or a combination of solvent and temperature. In particular, a phase-separation technique, such as Polymerization-Induced Phase Separation(PIPS), Thermally-Induced Phase Separation(TIPS) or Solvent-Induced Phase Separation can be used to form liquid crystal microdroplets dispersed in the PDLC film structure.

In the illustrative embodiment, the liquid phase encapsulated within each liquid crystal microdroplet generally comprises: (i) a large percentage of liquid crystal molecules (e.g. about 99% by volume); (ii) a very small percentage of liquid prepolymer or monomer (e.g. less than 1.0% by volume); and (ii) a very small percentage of curing agent, such as liquid photo-initiator (e.g. less than 1.0% by volume). While the encapsulated liquid crystals may be of the nematic, smectic or cholesteric type, nematic liquid crystals are the preferred light scattering medium in the illustrative embodiments. Upon completing this stage of the manufacturing process, the substrates are removed to provide a PDLC film structure having a thin layer of PDLC film sandwiched between optically transparent, conducting electrode layers 42 and 43. The length and width dimensions of the resulting PDLC film structure may be large or small depending upon the commercial application.

As shown in FIG. 3G, the second step of the method involves exposing the entire PDLC film structure to a pattern of ultra-violet(UV) light projected using spatial mask 140 and UV light projector 141, while a "reference" electric field, directed substantially perpendicular to the plane of the PDLC film structure, is applied across optically transparent electrode layers 42 and 43 in order to align the optical axis of each liquid crystal microdroplet parallel therewith. Preferably, the pattern of light transmission apertures 140A in spatial mask 140 is substantially similar to the electrode pattern shown in FIG. 3D. During this stage of the manufacturing process, several chemical reactions occur. Firstly, those portions of the photo-sensitive polymer matrix (i.e. PDLC film structure) that have been exposed to the UV light pattern become cured. Secondly, the monomer material in the liquid crystal microdroplets that have been exposed to the UV light pattern becomes polymerized in the presence of the photo-initiator and UV light, thereby forming a polymer network in each such liquid crystal microdroplet. The function of the polymer network within each microdroplet is to physically entrap the liquid crystal molecules therewithin so that the optical axis of the microdroplet is elastically biased or aligned parallel to the direction of the reference electric field (i.e. perpendicular to the plane of PDLC film layer). During this stage of the manufacturing process, the regions of the PDLC film structure that are blocked by the spatial mask, do not cure in the absence of UV light. The result of this step of the manufacturing process is the formation of a first pattern of polymer-dispersed liquid crystal microdroplets whose optical axes are elastically biased in a direction perpendicular to the plane of the PDLC film structure.

As shown in FIG. 3H, the third step of the method involves first removing the reference electric field from across the electrode layers 42 and 43. In the absence of an external electric field, the optical axes of the microdroplets blocked from the UV light pattern during the previous stage, are now permitted to orient their respective optical axes in a random manner within the photo-sensitive polymer matrix. Then, the entire PDLC film structure is exposed to ultraviolet(UV) light using the UV light projector 141 (without spatial mask 140), while the "reference" electric field is removed from across electrode layers 42 and 43. During this stage of the manufacturing process, several photo-chemical reactions occur. Firstly, the remainder of the photo-sensitive polymer matrix is cured. Secondly, monomer material in microdroplets with randomly oriented optical axes, becomes polymerized in the presence of the photo-initiator and UV light, thereby forming a polymer (i.e. polydomain) network in each such microdroplet. The function of the polymer network within each such microdroplet is to physically entrap the liquid crystal molecules therewithin so that the optical axis of each microdroplet is elastically biased in a random orientation.

The resulting structure is a PDLC panel having a first pattern of polymer-dispersed liquid crystal microdroplets whose optical axes are elastically biased in a direction perpendicular to the plane of the PDLC panel, and a second pattern of polymer-dispersed liquid crystal microdroplets whose optical axes are elastically biased in directions that are random with respect to the plane of the PDLC panel.

When there is no external electric field applied across the electrode layers 42 and 43 of the PDLC panel, the randomly oriented optical axes of the second pattern of liquid crystal microdroplets provide the "light scattering (i.e. diffusing) state" of operation required to extract light from the backlighting panel during the direct viewing mode. At the same time, the second pattern of liquid crystal microdroplets in PDLC panel 26' achieves the desired degree of intensity compensation required in the backlighting panel.

When an external electric force field is applied across the electrode layers 42 and 43 in a direction perpendicular to the plane of the PDLC panel, the optical axes of second pattern of liquid crystal microdroplets are forcefully reoriented away from their random directions and aligned parallel to the direction of the elastically biased optical axes of the first pattern of liquid crystal microdroplets. This provides the "light non-scattering state" of operation required for non-diffusive passage of projected light during the projection viewing mode.

For the remainder of the description of the present invention, it shall be assumed for exposition purposes only that light intensity compensation in light guiding structure 25 is achieved using a patterned PDLC layer 26 and electrode surfaces 42 and 43, as shown in FIGS. 3A and 5B and described above. It is understood, however, that the description generally applies when PDLC layers 26', 26" or any other functionally equivalent structure is used for selectively controlling light diffusion in the backlighting panel of the present invention.

In the direct viewing mode of operation, when no applied electric field is applied across electrodes 42 and 43 of the first PDLC panel, the liquid crystal molecules dispersed therein are randomly oriented. Consequently, the light conducted within light guiding structure 25 is scattered the most along the central portion thereof. The result is a substantially uniform light intensity distribution emanating from light guiding structure 25 in the direction of LCD panel 33, as well as in the direction of PDLC panel 31.

To ensure that only LCD panel 33 of the display panel assembly imparts a spatial intensity modulation to the light distribution emanating from the display surface towards the viewer's eyes, it is essential the light intensity behind LCD panel 33 be highly uniform along the x and y coordinates of the display panel assembly. The function of the PDLC panel 31 is to further ensure that this condition is satisfied by uniformly diffusing (i.e. scattering) light passing through light guiding surface 25D. In the illustrative embodiment, this light diffusion function is achieved by constructing the PDLC panel 31 in a manner similar to that of the first PDLC panel (i.e. light guiding structure 25). Specifically, opposing interior surfaces 31E and 31F of optically transparent panels 31A and 31B are coated with optically transparent electrically-conductive layers 46 and 47 (e.g. Indium Tin Oxide ITO) having ultra-thin dimensions (e.g. 1000 to 5000 angstroms). As shown, PDLC layer 31G is disposed between these electrically conductive electrode surfaces. In the PDLC panel 31, the distribution (i.e. density) of liquid crystal molecules is substantially uniform across the horizontal dimensions of the panel. The index or refraction of optically transparent panels 31A and 31B and the cured polymer matrix (supporting liquid crystal molecules) therebetween are substantially identical. In the direct viewing mode, when no external electric field is applied across electrode surfaces 46 and 47, the electric field vectors of the polymer-dispersed liquid crystals between these electrode surfaces are randomly oriented and light rays emerging from light guiding structure 25 and passing through the PDLC panel 31 are uniformly scattered in accordance with the well known Lambertian distribution. The result is a highly uniform light intensity distribution emerging from the PDLC panel 31 in the direction of PDLC panel 34. In the projection viewing mode, when an external electric field (i.e. voltage) is applied across electrode surfaces 46 and 47, the electric field vectors of the polymer-dispersed liquid crystals between these electrode surfaces align with the applied electric field, to yield the light non-scattering state of operation. In this switched optical state, light rays projected perpendicularly through light guiding structure 25 from an external light projector, pass through PDLC panel 31 without scattering, as required to illuminate LCD panel 33 during the projection viewing mode of the display subsystem of the present invention.

In display panel assembly 10, the function of the PDLC panel 34 is similar to the function of PDLC panel 31, described above. Specifically, during the direct viewing mode, the function of PDLC panel 34 is to further diffuse (i.e. scatter) light emerging from PDLC panel 31. In the illustrative embodiment, this light diffusion function is achieved by constructing the PDLC panel 34 in a manner identical to that of the PDLC panel 31. Specifically, opposing interior surfaces 34E and 34F of optically transparent panels 34A and 34B are coated with optically transparent electrically-conductive layers 48 and 49 (e.g. , Indium Tin Oxide ITO) having ultra-thin dimensions (e.g. 1000 to 5000 Angstroms). As shown, PDLC layer 34G is disposed between these electrically conductive electrode surfaces. In the PDLC panel 34, the distribution (i.e. density) of liquid crystal molecules is substantially uniform across the horizontal dimensions of the panel. The index or refraction of optically transparent panels 34A and 34B and the cured polymer matrix (supporting liquid crystal molecules) therebetween are substantially identical. In the direct viewing mode, when no external electric field is applied across electrode surfaces 48 and 49, the electric field vectors of the polymer-dispersed liquid crystals between these electrode surfaces are randomly oriented and light rays emerging from PDLC panel 31 and passing through the PDLC panel 34 are uniformly scattered in accordance with the well known Lambertian distribution. The result is a very-highly uniform light intensity distribution emerging from the PDLC panel 34 in the direction of LCD panel 33.

In the direct viewing mode, light scattering within the light guiding structure 25 generally occurs in accordance with the well known Lambertian distribution. The scattered light rays propagating in the direction of reflective surface 40 first passes through PDLC panel 36 and Fresnel lens panel 38, reflects off reflective surface 40 and then passes through Fresnel lens panel 38, PDLC panel 36 and light guiding structure 25 prior to passing through PDLC panels 31 and 34 and ultimately onto LCD panel 33. During the direct viewing mode, PDLC panel 36 functions to diffuse this scattered/reflected light as it propagates through light transmission surfaces 36C and 36D of PDLC panel 36. This light diffusion function is achieved by constructing the PDLC panel 36 in a manner similar to that of the PDLC panels 30, 31 and 34. Specifically, opposing interior surfaces 36E and 36F of optically transparent panels 36A and 36B are coated with optically transparent electrically-conductive layers 51 and 52 (e.g., Indium Tin Oxide ITO) having ultra-thin dimensions (e.g. 1000 to 5000 Angstroms). As shown, PDLC layer 36G is disposed between these electrically conductive electrode surfaces. In the PDLC panel 36, the distribution (i.e. density) of liquid crystal molecules is substantially uniform across the horizontal dimensions of the panel. The index of refraction of optically transparent panels 36A and 36B and the cured polymer matrix (supporting liquid crystal molecules) therebetween are substantially identical. In the direct viewing mode, when no external electric field is applied across electrode surfaces 51 and 52, the electric field vectors of the polymer-dispersed liquid crystals between these electrode surfaces are randomly oriented and light rays reflecting off reflective surface 40, and passing through PDLC panel 36 are uniformly scattered in accordance with the well known Lambertian distribution. The result is a highly uniform light distribution emanating from PDLC panel 36 in the direction of light guiding structure 25.

In the direct viewing mode, the collective function of light guiding structure 25 and electronically-controlled light diffusing panels 31, 34, and 36 is to produce a plane of backlighting having a highly uniform light intensity characteristics along the x and y coordinate directions of LCD panel 33. In order to display imagery of one sort or another from the computer system, LCD panel 33 spatially modulates the intensity of the plane of uniform backlighting as it propagates through the LCD panel.

In the illustrative embodiments, LCD panel 33 comprises a programmable spatial color mask (i.e. spatial spectral mask) disposed over a programmable spatial light intensity mask (i.e. spatial light modulator or SLM). In general, the programmable spatial light mask comprises a first array (i.e. matrix) of electrically addressable pixels, and the programmable spatial color mask comprises a second array of electrically addressable pixels.

In a manner well known in the art, each pixel in the programmable spatial light mask is formed from a material having a light transmittance (over the optical band) which can varied in accordance with pixel intensity information to be displayed. In a conventional manner, each pixel in this spatial light mask is driven by pixel driver circuitry 11 operated under the control of display controller 13. The degree to which the light transmittance of each pixel in the array is modulated, is determined by the gray-scale or intensity information contained in the corresponding pixel location in frame buffer 12. The gray scale information of a particular image to be displayed is written in frame buffer 12 by display processor 13, and is scanned and converted into pixel drive signals by the pixel driver circuitry 11.

When color images are to be displayed, the programmable spatial color (i.e. spectral) mask is actively driven by pixel driver circuitry 11. Each pixel in the programmable spatial color mask has spectral transmittance characteristics which can varied in accordance with color information to be displayed. In a conventional manner, each of the pixels in the programmable spatial color mask is driven by designated driver lines of X and Y pixel drivers 11. The spectral transmittance characteristics of each pixel in the array are determined by the pixel color information in frame buffer 12.

Having described the first illustrative embodiment of the display panel assembly of the present invention, it is appropriate to describe the second illustrative embodiment thereof designated by reference numeral 10'.

As shown in FIGS. 3 and 3B in particular, the display panel assembly 10' comprises a novel electro-optical backlighting panel construction integrated with a conventional LCD display panel. The electro-optical backlighting panel construction comprises a number of integrated components, namely: an optically transparent light guiding panel 25'; fluorescent lighting tubes 27 and 28; elongated concave light reflectors 29 and 30; electrically-controlled PDLC panel 31 directly laminated onto front surface 25B' of light guiding panel 25'; electrically-controlled PDLC panel 34 affixed to the front surface of electrically-controlled PDLC panel 31 with an ultra-thin air gap 35 disposed therebetween; electrically-controlled PDLC panel 36 affixed to rear surface 25A' of light guiding panel 25' with an ultra-thin air gap 37 therebetween; and Fresnel lens zone structure formed in a thin optically transparent layer 38 affixed to the rear surface of electrically-controlled PDLC panel 36 with ultra-thin air gap 39 disposed therebetween. Together, panels 25', 31, 34, 36 and 38 form the electro-optical backlighting panel of composite construction. In the illustrative embodiment, active-matrix LCD display panel 33 is affixed to the front surface of the electrically-controlled PDLC panel 34 with ultra-thin air gap 50 disposed therebetween. As such, panels 25', 31, 33, 34, 36 and 38 are integrally connected to form as a single composite structure, display panel assembly 10'. In the preferred embodiment, the overall thickness of this composite structure is less than 10 millimeters.

As shown in FIGS. 3 and 3B, reflective layer 40 is applied to the inner surface of rear panel 21 in substantially the same manner provided in the first illustative embodiment of the display panel assembly. In the direct viewing mode, reflective layer 40 is disposed adjacent Fresnel lens panel 38, whereas reflective layer 40 and rear panel 21 are removed away from the backlighting panel hereof in the projection viewing mode shown in FIGS. 5 to 5B.

In display panel assembly 10', light guiding panel 25' is in the form of solid sheet of material (e.g. PVA or PMMA) having the same index of refraction as optically transparent panels 31A and 31B, and the polymer matrix of PDLC layer 31G disposed therebetween. Preferably, the thickness of light guiding panel 25' is in the range of from about 1 to about 5 millimeters. Electrically controlled PDLC panel 31 is constructed as described above in connection with display panel assembly 10. When light guiding panel 25' and optically transparent panel 31A are secured together by a suitable adhesive, the index of refraction is constant (i.e. substantially the same) from light guiding surface 25A' to light transmission surface 31D of PDLC panel 31.

In display panel assembly 10', fluorescent lighting tubes 27 and 28 are driven by power supply 19 and supported in miniature fixtures attached to the side edges of light guiding panel 25'. The fluorescent tubes are closely positioned along and in close proximity with opposing side edges of light guiding panel 25' so that emitted light from the tubes is focused by reflectors 29 and 30 along the side edges of the light guiding panel and effectively conducted into the interior of light guiding panel 25'. In all other respects, display panel assembly 10' is constructed in a manner similar to display panel assembly 10.

In the direct viewing mode of operation, when no applied electric field is applied across electrodes 46 and 47 of PDLC panel 31, the liquid crystal molecules dispersed therein are randomly oriented. Consequently, the conducted light within the light guiding panel 25' is scattered the most along the central portion of PDLC panel 31, with a substantially uniform light intensity distribution emanating from PDLC panel 31 in the direction of PDLC panel 34. In the direct viewing mode, PDLC panels 34 and 36, Fresnel lens panel 38, reflective layer 40, and LCD panel 33 of display panel assembly 10' operate and function in the same manner in display panel assembly 10. In the projection viewing mode, PDLC panels 34 and 36, and LCD panel 33 of display panel assembly 10' operate and function in the same manner in display panel assembly 10.

Computer-based system 1 of the illustrative embodiment has two direct viewing modes of operation, namely: An Illuminated Direct Viewing Mode for directly viewing images displayed on LCD panel 33; and An Illuminated Direct Backlighting Mode for directly viewing optically translucent film structures, such as slides and optical transparencies. Both of these direct viewing modes will be described below.

Portable computer system 1 is operated in its Illuminated Direct Viewing Mode of operation by performing the following simple operations: (i) moving rear panel 21 and reflective surface 40 against Fresnel lens panel 38 of display panel assembly 10; (ii) electronically reconfiguring display panel assembly 10 into its direct viewing state of operation by not applying an electric field across the optically transparent electrodes of the PDLC panels 25, 31, 34 and 36; and (iii) then driving fluorescent tubes 27 and 28 in order to inject light into light guiding panel 25, while driving LCD panel 33 with pixel drive signals derived from the image data set written into frame buffer 12. However, in certain circumstances it might be desirable to operate the computer system in an alternative direct viewing mode, in which the fluorescent tubes 27 and 28 and light diffusing panels 25, 31, 34 and 36 are not driven, and backlighting is provided solely by ambient light passing through the display panel assembly 10 and reflecting off reflective layer 40 in the direction of the viewer of LCD panel 33. This alternative mode of direct viewing is referred to as the Direct Reflection Viewing Mode of operation and is particularly useful when the intensity of ambient light is high, as in outdoor environments, and when electrical power reserves in the portable computer are limited.

Preferably, portable computer system 1 is operated in its Illuminated Direct Backlighting Mode of operation by performing the following simple operations: (i) moving rear panel 21 and reflective surface 40 against Fresnel lens panel 38 of display panel assembly 10; (ii) electronically reconfiguring display panel assembly 10 into its direct viewing state of operation by not applying an electric field across the optically transparent electrodes of the PDLC panels 25, 31, 34 and 36; and (iii) then driving fluorescent tubes 27 and 28 in order to inject light into light guiding panel 25, while not driving LCD panel 33 with pixel drive signals.

The structure and function of display panel assemblies 10 and 10' have been described above in great detail. It is appropriate at this juncture to now describe the portable light projection device of the present invention.

Figure 4A:
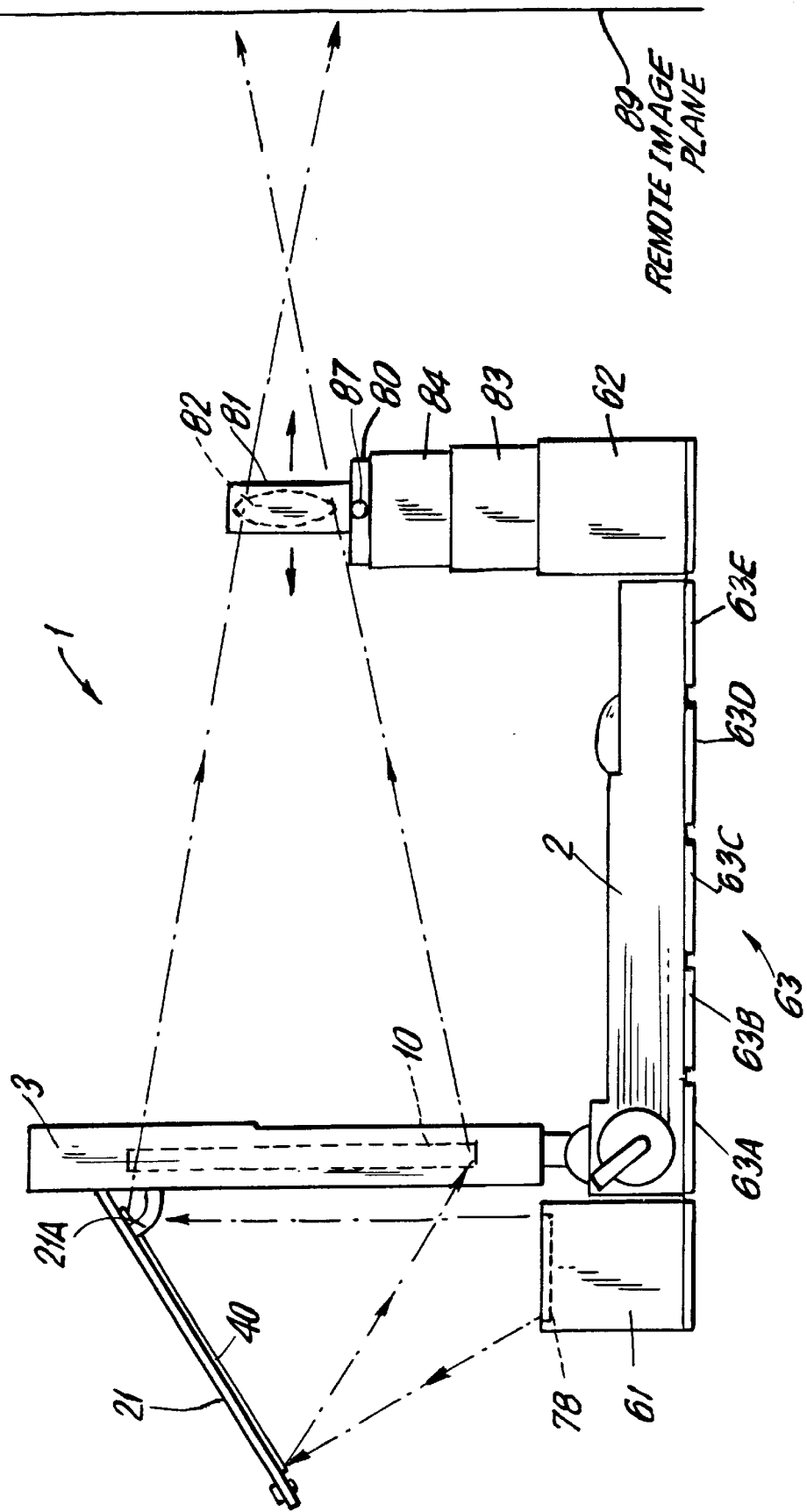
FIG. 4A is an elevated side view of the portable computer-based system of the first illustrative embodiment, shown arranged in its projection viewing configuration.
Figure 4B:
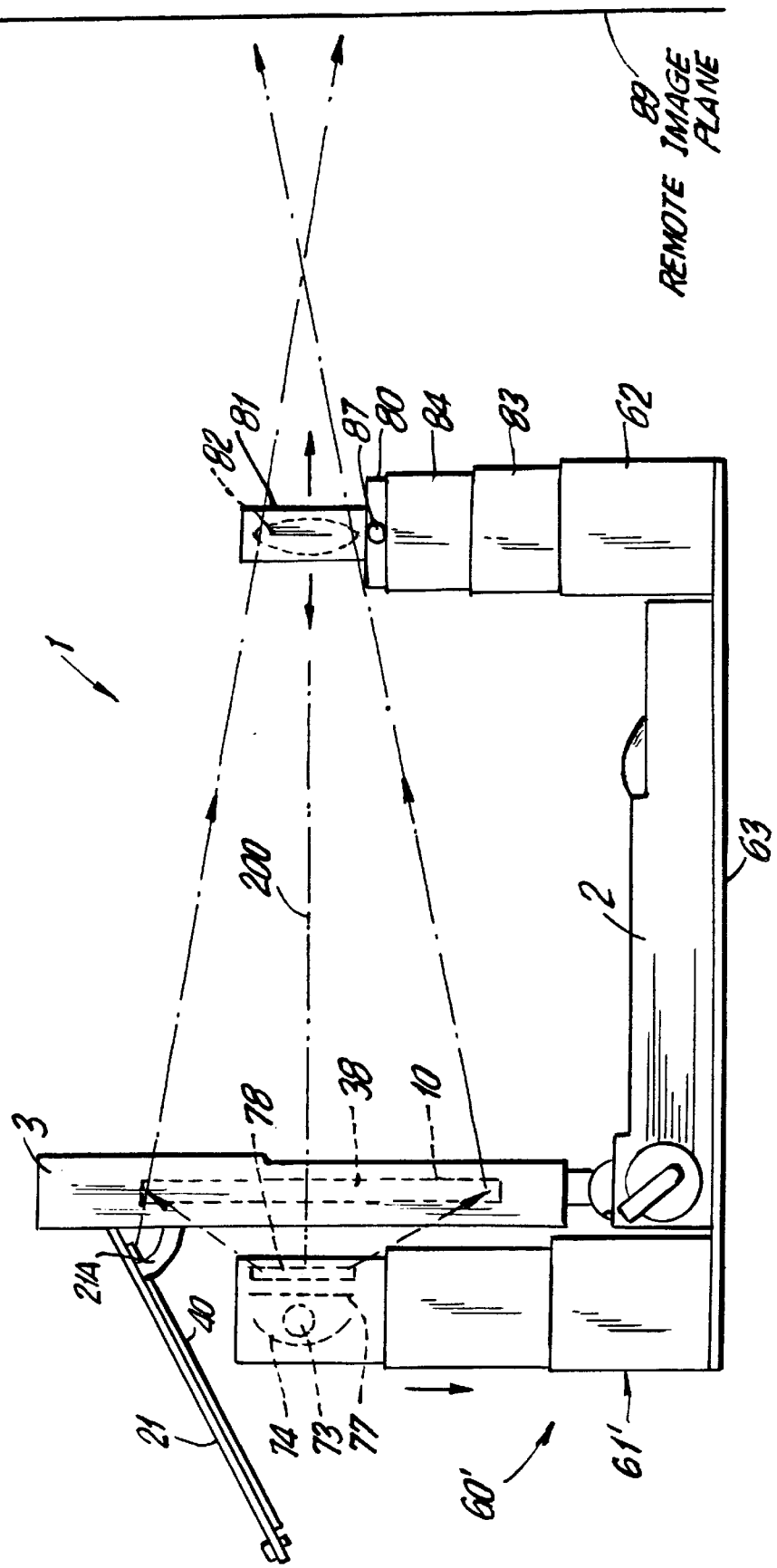
Figure 6A:
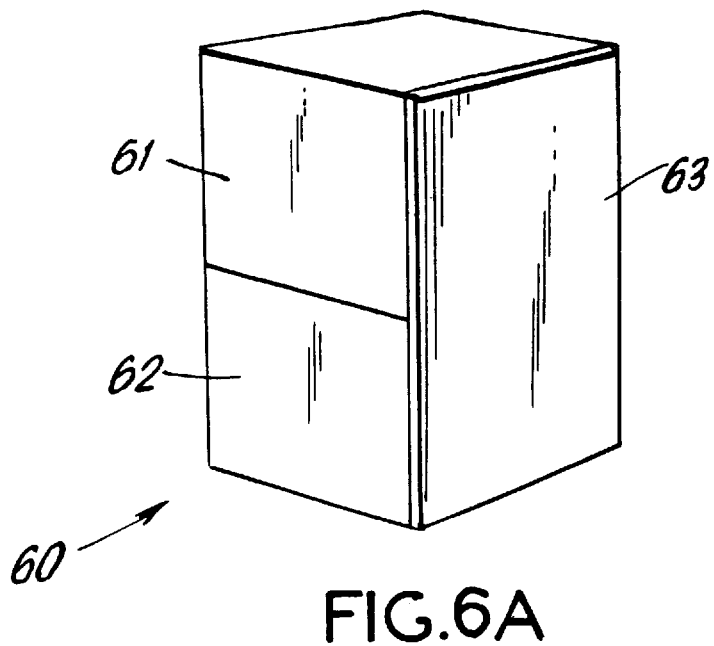
FIG. 6A is a perspective view of the portable accessory device of the present invention, shown arranged in its compact storage configuration.

As shown in FIGS. 6A to 8, portable light projection device 60 of the present invention comprises a number of structural components, namely: first and second housing portions 61 and 62; and foldable structure 63. As shown in its compact storage configuration in FIG. 6A, first and second housing portions 61 and 62 are releasably joined at their ends in a snap-fit manner. As shown in its partially extended configuration in FIG. 6B, the first and second housing portions are shown interconnected by foldable structure 63. In the illustrative embodiment, first and second housing portions 61 and 62 each have a cubical geometry, while foldable structure 63 is realized as a plurality of hingedly connected panels 63A to 63E. As shown, each panel is hinged to at least one other panel, and one panel is hinged to the bottom of the first housing portion, and another panel is hinged to the bottom of second housing portion. These panels can be folded upon each other in sequence, and then the upper rim 65 of first housing portion connected to the upper groove 66 formed in the second housing portion, as shown in FIG. 6A. When the portable light projection device is needed for the projection viewing mode, the first and second housing portions can be separated and the panels unfolded so that the housing portions are separated by a distance substantially equal to the width of the base of the computer system, as shown in FIG. 4A.

Figure 7:
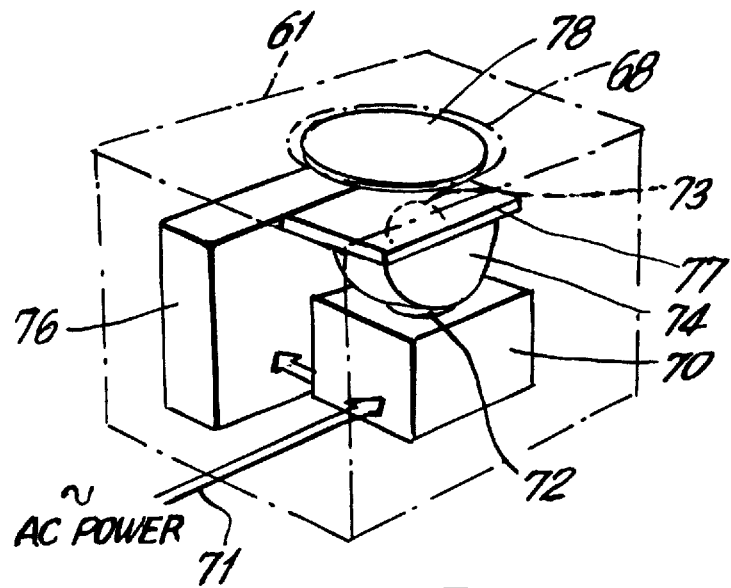
FIG. 7 is a schematic diagram of the first housing portion of the portable light projecting device of the present invention, showing various subcomponents contained within this portion of the device.

As shown in FIG. 7, first housing portion 61 contains electrical power circuitry 70 for transforming standard household AC power (60 Hz), supplied over electrical wiring 71, to a sufficient level of DC power. Mounted above this circuitry is an electrical socket 72 within which is mounted an incandescent lamp 73. About the lamp is a parabolic light focusing reflector 74. Electrical socket 72 and an ON/OFF switch 75 externally mounted through the side wall of the first housing portion are connected to electrical power circuitry 70. An internal fan unit 76 is connected to electrical power circuitry 70 for maintaining the temperature of the lamp at a safe operating level. Mounted above the light focusing reflector 74 is a polarizing filter panel 77 which polarizes the light produced from lamp. Preferably, polarization filter 77 is manufactured from cholesteric liquid crystal(CLC) material, as disclosed in U.S. Pat. No. 5,221,982 to Applicant, which is incorporated by reference in their entirety. While polarizing filter 77 is shown in the form of a panel, the function which it achieves can be realized in a material applied as a coating over a high-intensity light bulb, such as incadescent lamp 73. Significantly, the installation of polarizing filter 77 in the portable light projection device avoids dissipating the power of the undesired polarization component across LCD panel 33 of the LCD panel assembly. Consequently, display panel assembly 10 (and 10') is permitted to operate a lower temperatures without need for cooling or display-panel temperture measures in the portable computer system when operated in its projection viewing mode.

Above the light polarizing panel 77, and below light aperture 68 in housing 61, is an adjustable optics assembly 78 for focusing produced polarized light on the interior surface of the rear panel. Optics assembly 78 includes a lens system mounted in housing portion 61 in a conventional manner. Preferably, slidable lens mounts are used to support the lenses of this system in a manner that permits adjust of the focal length thereof by rotation of knob 69, external to housing portion 61.

Figure 6B:
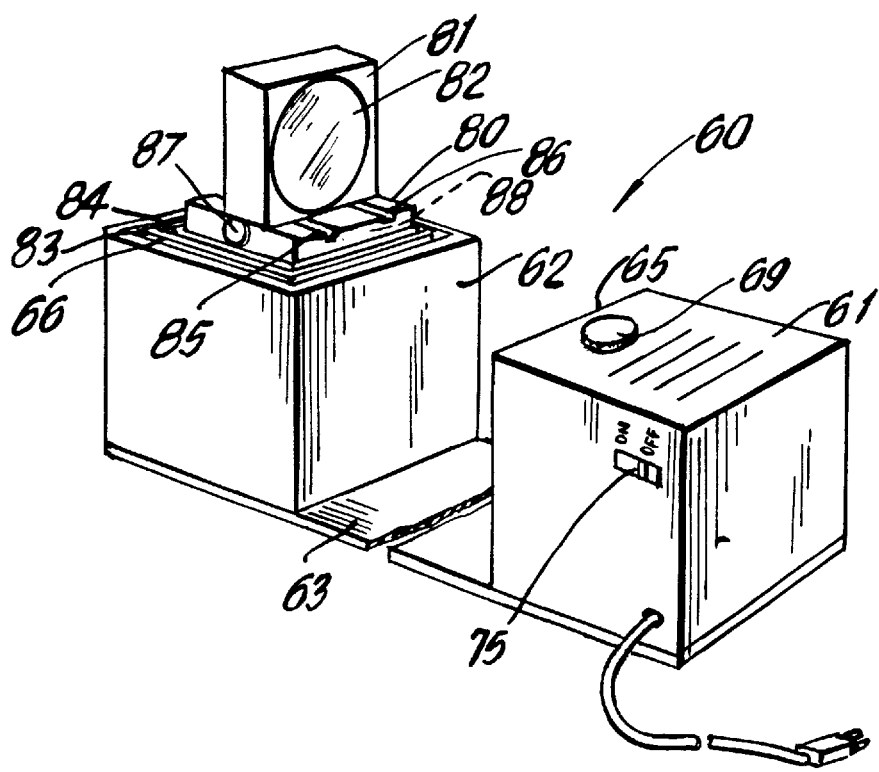
FIG. 6B is a perspective view of the portable light projection device of the present invention, shown partially extended but not completely arranged in its light projecting and image focusing configuration.
Figure 8:
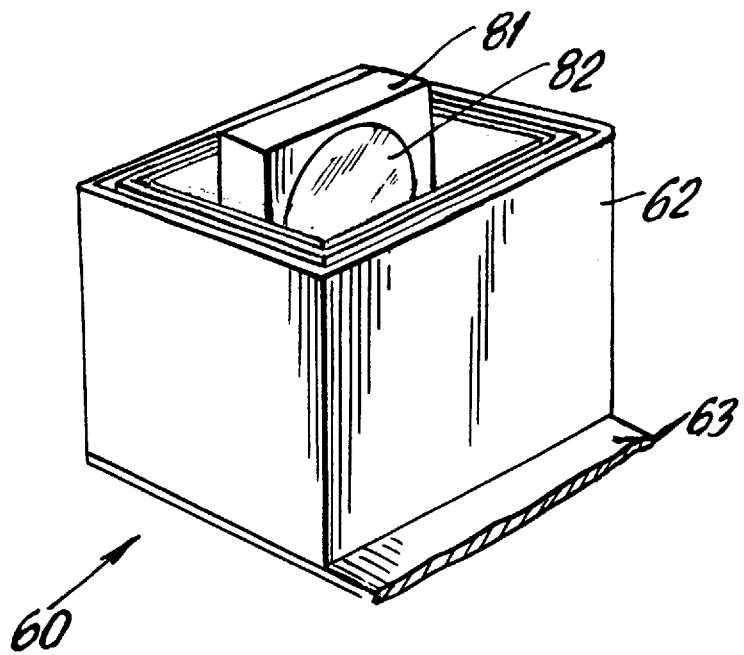
FIG. 8 is a perspective view of the second housing portion of the portable light projecting device of the present invention, showing the various subcomponents contained within this portion of the device.

As shown in FIGS. 6B and 8, the second housing portion contains an optical platform 80 a lens holder 81, light projection lens 82, and first and second platform support sleeves 83 and 84. As shown in FIG. 4A, platform 80 is mounted upon the top portion of platform support 82, whereas platform support sleeves 83 and 84 are telescopically interconnected and joined to the cubic shaped second housing portion 62. As shown in FIGS. 4A and 6B, lens holder 81 is slidably mounted within grooves 85 and 86 formed in optical platform 80 such that the position of lens holder 81 along the optical platform can be easily adjusted by simply rotating a knob 87. In the preferred embodiment, knob 87 is operably associated with a platform translation mechanism 88 contained beneath optical platform 80 itself. Within lens 81, image projection lens 82 is securely mounted. With the above described arrangement, image projection lens 82 can be adjustably positioned with respect to LCD panel 33 in order to project a focused video image onto a desired viewing surface.

A method of using portable light projection device 60 with portable computer system 1 will be described below. However, as display panel assemblies 10 and 10' have similar modes of operation, the following description shall be made with reference to portable computer system 1 incorporating display panel assembly 10 into its image display subsystem.

In FIGS. 4 and 4A, portable computer system 1 is shown arranged in the projection viewing configuration using portable light projection device 60. The projection viewing configuration is achieved by arranging the portable light projecting device in its extended configuration, about base 2 of the computer system, as shown. Hinged rear housing panel 21 is pulled outwardly away from Fresnel lens panel 38 so that light reflective surface 40 is supported at about a 45 degree position with respect to the Fresnel lens panel by a conventional support mechanism 21A, as shown in FIG. 4A. In projection viewing configuration, the first housing portion 61 of the portable light projecting device is disposed below the reflective surface, while an image projection lens 62 extends from the second housing portion 63.

Once configured as shown in FIG. 4A, portable light projection device 60 is adjusted as follows. First, the lateral position of first housing section 61 is adjusted so that the optical axis of projection lens 78 in the first housing portion is aligned under reflective surface 40. Lens holder 81 is then pulled upwardly out of the frictional embrace of the second platform support sleeve 84, as shown in FIG. 6B. Then by pulling further upwardly, the second platform support sleeve 84 slides out of the frictional embrace of the first platform support sleeve 83 and then when further pulled upwardly, the first platform support sleeve slides out of the frictional embrace of the cubic shaped second housing portion, as shown in FIG. 4A. Then, with power supplied to light source 73 and light emitting therefrom, the position of projection lens 82 along the optical axis of Fresnel lens panel 38 is adjusted so that the images formed on the display surface of LCD panel 33 are projected as enlarged focused images onto large viewing surface 89. In general, projection lens 82 is positioned in front of the display panel assembly at a distance equal to the focal length of Fresnel lens panel 38.

When it is desired to arrange portable light projecting device 60 back into its compact storage configuration, as shown in FIG. 6, lens holder 81 is simply pushed downwardly, to collapse platform support sleeves 83 and 84 in a manner opposite to the telescopic extension process described above. Thereafter, hingedly connected panels 63A to 63E are folded upon each other and finally first housing portion 61 is snap-fit connected to second housing portion 62, to provide a single interconnected unit of physical dimensions of 3"×3"×6", as shown in FIG. 6A The geometrical optics that describe the image projection process are graphically illustrated in FIG. 4A. Specifically, during the projection viewing mode, the light rays produced from light source 73 in the first housing portion are first polarized by polarizer 77, and then focused in a divergent manner onto reflective surface 40 by projection lens 78. The polarized light rays are then reflected off reflective surface 40, passed through backlighting construction of display panel assembly 10 with minimal attenuation and ultimately passed through and optically processed by LCD panel 33. The light rays emanating from actively driven LCD panel 33 are spatial intensity modulated and spectrally filtered in accordance with the X,Y drive signals provided to pixel driver circuitry 11, and are then focused by projection lens 82 to produce a focused video image on viewing surface 89, which is typically located at the focal distance of projection lens 82. The structural details of the display panel assembly in the projection viewing configuration are shown in FIGS. 5 to 5A.

Advantageously, portable computer system 10 has two different projection viewing modes, namely: a Projection Viewing Mode and an Enhanced Projection Viewing Mode. Notably, selection of either of these modes of image viewing is achieved without having to disassemble or mechanically reconfigure the display panel assembly of the present invention.

Computer system 1 can be operated in its Projection Viewing Mode by performing the following simple operations: (i) moving rear panel 21 and reflective surface 40 away from Fresnel lens panel 38 of display panel assembly 10; (ii) electronically reconfiguring display panel assembly 10 into its projection viewing state of operation by applying an electric field across the optically transparent electrode surfaces of PDLC panels 25, 31, 34 and 36; and (iii) then projecting an external source of light therethrough while driving LCD panel 33 with X,Y pixel drive signals derived from the image data set written into frame buffer 12. Notably during this mode of operation, fluorescent tubes 27 and 28 are not supplied with electrical power and light from portable light projecting device 60 is used to provide backlighting for LCD panel 33, as described above.

Computer system 1 can be operated in its Enhanced Projection Viewing Mode by performing the following simple operations: (i) moving rear panel 21 and reflective surface 40 away from Fresnel lens panel 38 of the display panel assembly; (ii) electronically reconfiguring the display panel assembly into its projection viewing state of operation by applying an electric field across the optically transparent electrode surfaces of PDLC panels 25, 31, 34 and 36; (iii) supplying electrical power from supply 19 to fluorescent tubes 27 and 28; and (iv) then projecting an external source of light therethrough while driving LCD panel 33 with pixel drive signals derived from the image data set written into frame buffer 12.

In either of the above-described projection viewing modes, power supply 19 is used to apply an electric field across the optically transparent electrode surfaces of PDLC panels 25, 31, 34 and 36. In the illustrative embodiment, the electric field strength applied across each of these panels is in the range of about 2 to about 20 Volts/micron. In each of these projection viewing modes, the electric field vectors of the dispersed liquid crystal molecules become physically aligned in the direction of the externally applied electric field, as illustrated in FIG. 5C. In this optical state, light passes through these physically aligned liquid crystal molecules without scattering, and is ultimately intensity and spectrally modulated by LCD panel 33, on a pixel by pixel basis.

Figure 9:
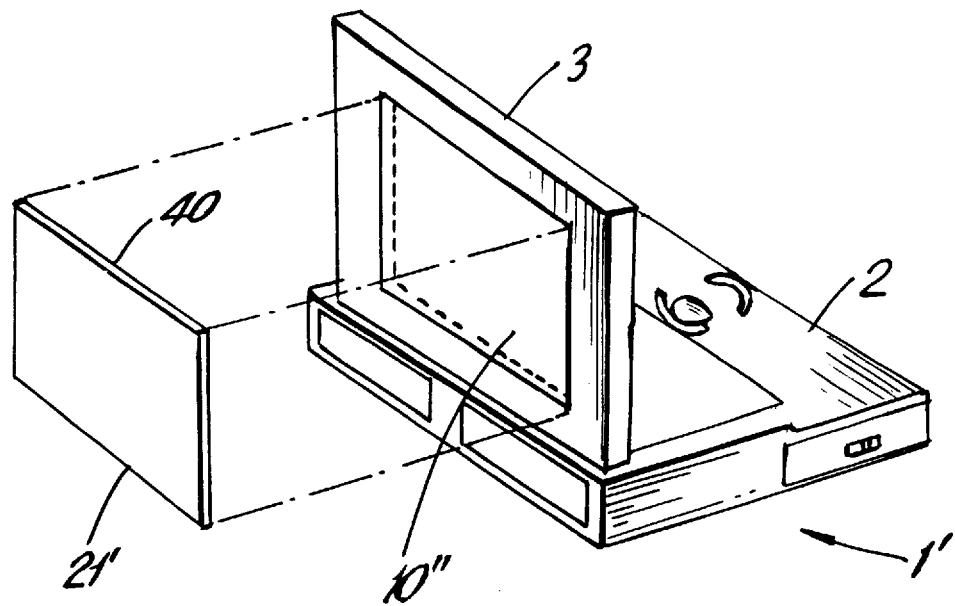
FIG. 9 is a first perspective view of the portable computer-based system of the second illustrative embodiment of the present invention, shown configured for direct stereoscopic image viewing, and also illustrating the removal of the light reflective back panel from the hinged display portion of the housing.
Figure 10:
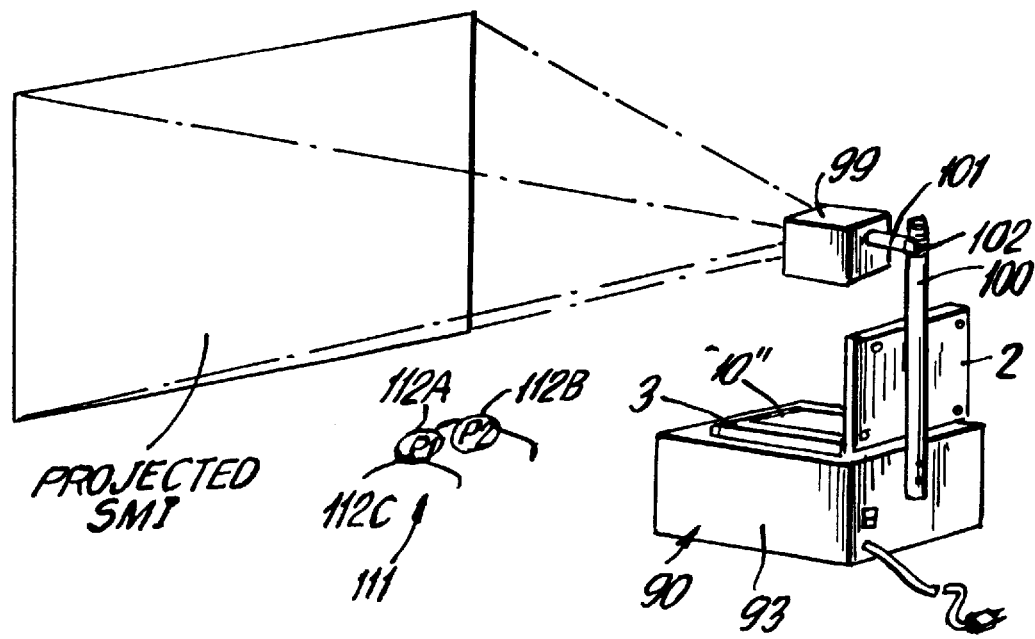
FIG. 10 is a perspective view of the portable computer-based system of the second illustrative embodiment, shown arranged in its projection viewing configuration, upon a conventional overhead image projector, with its light reflective back panel removed as shown in FIG. 9, for stereoscopic image projection.
Figure 10A:
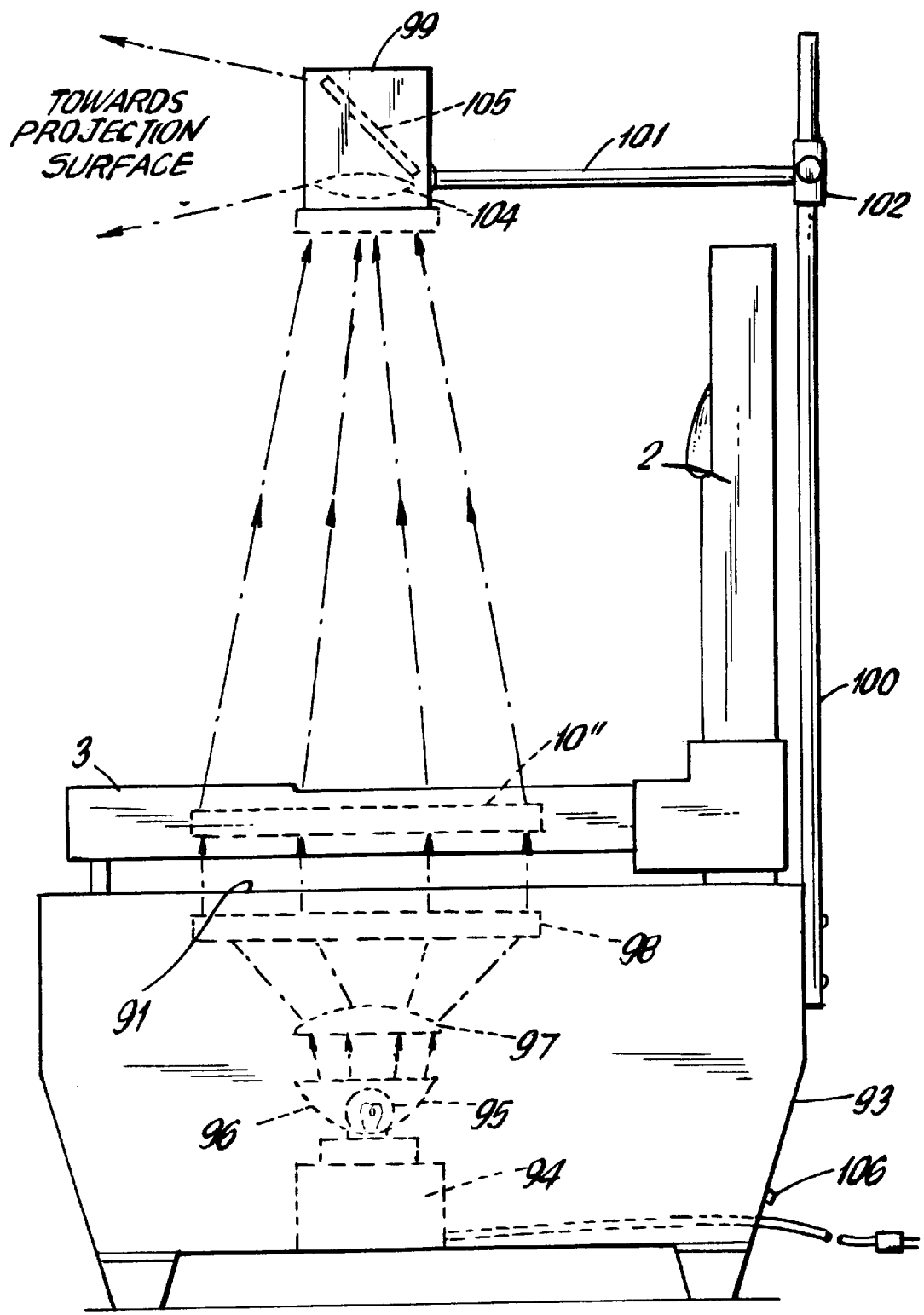
FIG. 10A is an elevated side view of the portable computer-based system of the second illustrative embodiment, shown arranged in its projection viewing configuration, upon a conventional overhead image projector of FIG. 10, for stereoscopic image projection.
Figure 11:
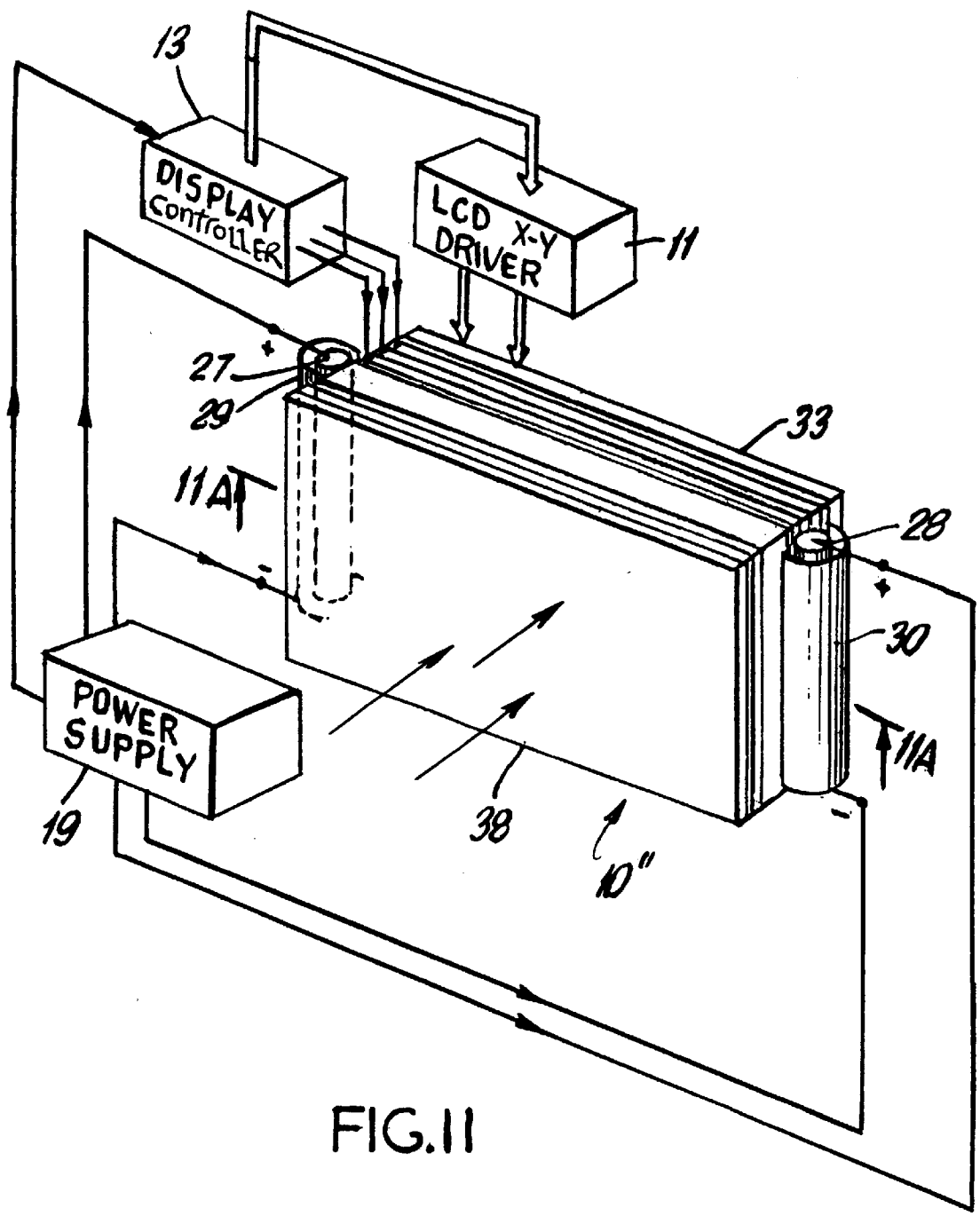
FIG. 11 is a schematic representation of the image display subsystem of the portable computer-based system of FIG. 10, shown with its display panel assembly configured in its projection viewing mode of operation.
Figure 11A:
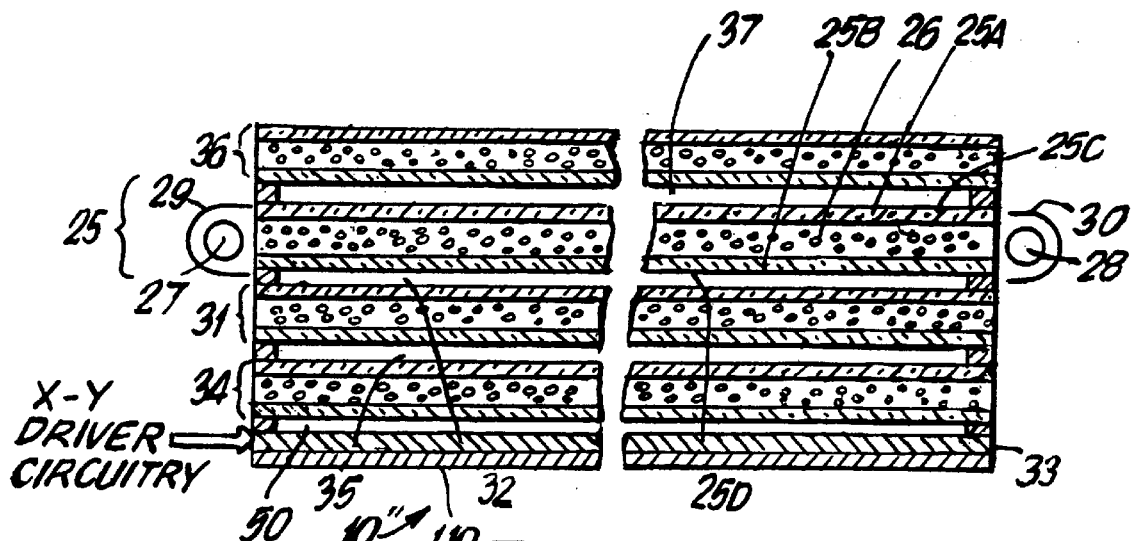
FIG. 11A is a cross-sectional view of the display panel assembly of the second illustrative embodiment of the present invention, taken along line 11A—11A of FIG. 11, showing the electro-optical light diffusing panels thereof being constructed in accordance with a first manufacturing technique of the present invention.
Figure 11B:
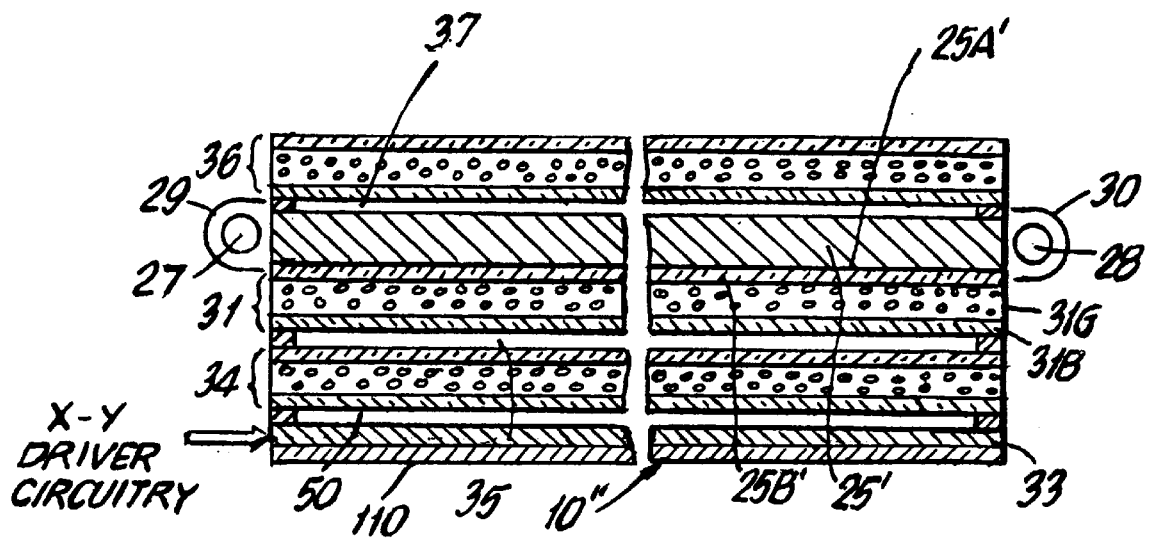
FIG. 11B is a cross-sectional view of the display panel assembly, taken along line 11A—11A of FIG. 11, showing the electro-optical light diffusing panels thereof being constructed in accordance with a second manufacturing technique of the present invention.
Figure 11C:
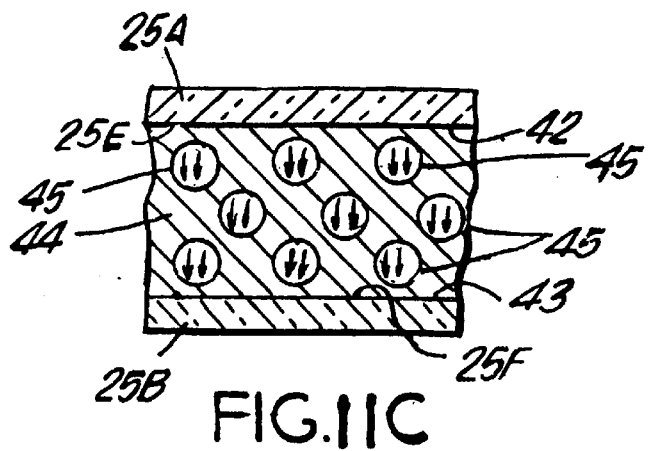
FIG. 11C is an enlarged, cross-sectional view of a portion of an electro-optical light diffusing panel in the display panel assembly of FIG. 11, shown during the projection viewing mode.

Referring now to FIGS. 9 to 11A, the second illustrative embodiment of the present invention is realized in the form of a portable computer system 1' capable of displaying spatially multiplexed images of 3-D objects for stereoscopic viewing thereof. In the illustrative embodiment, computer system 1' has the general system architecture shown in FIG. 2. In FIG. 9, computer system 1' is shown arranged in the direct viewing configuration. In FIGS. 10 and 10A, computer system 1' is shown arranged in its projection viewing configuration using a conventional overhead projector 90. Display panel assembly 10" of the third illustrative embodiment is shown in FIGS. 11 and 11A, whereas display panel assembly 10''' of the fourth illustrative embodiment is shown in FIGS. 11 and 11B.

As can be seen from FIGS. 11 and 11A, display panel assembly 10" is identical to display panel assembly 10 of the first embodiment, and the display panel assembly 10" is identical to display panel assembly 10''', with several modifications. In particular, a micropolarization panel 110 is directly laminated onto the front surface of LCD panel 33, and there is no Fresnel lens panel 36 affixed to PDLC panel 36. Notably, however, Fresnel lens panel 38 may be retained as in the first illustrative embodiment of the present invention. In addition, rear panel 21' in computer system 1' is adapted for simple removal during the projection viewing mode, as shown in FIG. 9.

In portable computer system 1', the function of LCD panel 33 is to display "spatially multiplexed images (SMI)" of a 3-D object for stereoscopic viewing through a pair of polarized glasses 111 worn by viewers thereof. In general, each spatially-multiplexed image displayed from either display panel assembly 10" or 10''' is a composite pixel pattern composed of first and second spatially modulated perspective images of the 3-D object. The first spatially modulated perspective image consists of a first pixel pattern that is representative of a first perspective image of the object and spatially modulated according to a first spatial modulation pattern. The second spatially modulated perspective image consisting of a second pixel pattern that is representative of a second perspective image of the object and spatially modulated according to a second spatial modulation pattern. The second spatial modulation pattern is the logical complement of the first spatial modulation pattern.

As best shown in FIGS. 11 and 11A, each spatially-multiplexed image displayed from LCD panel 33 is optically processed by micropolarization panel 110. In the illustrative embodiment, micropolarization panel 110 is realized as a optically transparent sheet directly mounted onto the display surface of LCD panel 33. Permanently formed within the optically transparent sheet are first and second optically transparent patterns. The first optically transparent pattern spatially corresponds to and is spatially aligned with the first pixel pattern in the displayed spatially-multiplexed image. The function of the first optically transparent pattern is to impart a first polarization state $P_1$ to the radiant energy (i.e. light) associated with the first pixel pattern. The second optically transparent pattern spatially corresponds to and is spatially aligned with the second pixel pattern in the displayed spatially-multiplexed image. The function of the second optically transparent pattern is to impart a second polarization state $P_2$ to the radiant energy (i.e. light) associated with the second pixel pattern. Importantly, the second polarization state $P_2$ is different than the first polarization state $P_1$ so that encoded perspective images are simultaneously displayed from polarization panel 110 with optically different polarization states. To ensure high spatial separation between the displayed perspective images, the first and second optically transparent patterns each have a spatial period of less than about 50 microns.

Details regarding the manufacture of micropolarization panel 110 are disclosed in copending U.S. application Ser. No. 07/536,419 entitled "Methods for Manufacturing Micro-Polarizers" filed on Jun. 11, 1990. Methods and apparatus for producing spatially-multiplexed images of 3-D objects are disclosed in copending U.S. application Ser. Nos. 08/126,077 entitled "Method and Apparatus for Recording and Displaying Spatially Multiplexed Images of 3-D Objects for Stereoscopic Viewing Thereof" filed Sep. 23, 1993; and 07/976,518 entitled "Method and Apparatus for Producing and Recording Spatially-Multiplexed Images for Use in 3-D Stereoscopic Viewing Thereof" filed Nov. 16, 1992. Each of these copending applications by Applicant is hereby incorporated by reference in its entirety as if set forth fully herein.

In the illustrative embodiment, optically-transparent polarizing lenses 112A and 112B are mounted within the frame 112C of polarized glasses 111. During stereoscopic viewing of images displayed or projected from computer system 1', the viewer wears polarized glasses 111 as he or she would wear conventional eyeglasses. When worn on a viewer's head, polarizing lens 112A is positioned adjacent to the left eye of a viewer, while the second optically transparent element 112B is positioned adjacent to the right eye of the viewer. Polarizing lens 112A is characterized by the first polarization state $P_1$ so as to permit the left eye of the viewer to view the first spatially modulated perspective image displayed from the micropolarization panel, while substantially preventing the left eye of the view from viewing the second spatially modulated perspective image displayed from the micropolarization panel. Polarizing lens 112B is characterized by the second polarization state $P_2$ so as to permit the right of the view to view the second spatially modulated perspective image displayed from the micropolarization panel, while substantially preventing the right eye of the viewer from viewing the first spatially modulated perspective image displayed therefrom. This way, the viewer is capable of 3-D stereoscopic viewing of the 3-D object without "cross-viewing" from adjacent visual channels established by the stereoscopic imaging scheme.

Using the above-described spatial-multiplexing technique and display panel assembly 10" or 10'", portable computer system 1' can directly-display or project polarized spatially-multiplexed images of 3-D objects for stereoscopic viewing through light-weight polarized glasses that can be adapted to the aesthetics of the viewer.

Portable computer system 1' is configured for the projection viewing mode by first removing back panel 21' as shown in FIG. 9. Then the display portion of the housing is placed over the light projection window of the overhead projector, as shown in FIG. 10. In the illustrative embodiment, the base portion of the computer is permitted to extend vertically, by itself, or by a simple bracing device 92 that can be snapped onto the edge of the base and display portions of the computer system, as shown in FIG. 10A. In other embodiments of the present invention, the display portion of the computer system can be detached from the base thereof, and connected therewith by a standard communication cable well known in the art. In this way, the display portion of the computer system containing display panel assembly 10" or 10" can be placed on top of the lens panel of the overhead projector, while the heavier base portion can be conveniently located elsewhere determined the user.

As shown in FIG. 10A, overhead projector 90 typically contains the following components within housing 93: power supply 94, lamp 95, focusing reflector 96, focusing lens 97, and Fresnel lens 98. Image projection head 99 is supported over the light projection window 91 of the projector by way of an adjustable support comprising vertical support member 100 attached to housing base 93, and horizontal support member 101 to which image head projector is connected at one end, and the vertical support member 100 is releasably connected at its other end, as shown, by slide mechanism 102. Within image projection head 99, image projection lens 104 and plane mirror 105 are mounted at about 45 degrees to the projection lens 104. The geometrical optics involved in the projection viewing process are clearly described by the ray tracing shown in FIG. 10A.

When configured as shown in FIGS. 10 and 10A, the computer system of the second illustrative embodiment is operated in its projection viewing mode by turning on the power to lamp 95 by ON/OFF switch 106, and then selecting the Projection Viewing Mode. In any embodiment of the present invention disclosed herein, selection of a Viewing Mode command can be made by way of either a keyboard entry operation, or by selecting the command or its graphical icon in a pulled-down menu supported by either the Macintosh System 7.1 operating system, the Microsoft Windows operating system, or like operating system. Alternatively, Viewing Modes can be selected by depressing designated switches accessible through the system housing.

Figure 12:
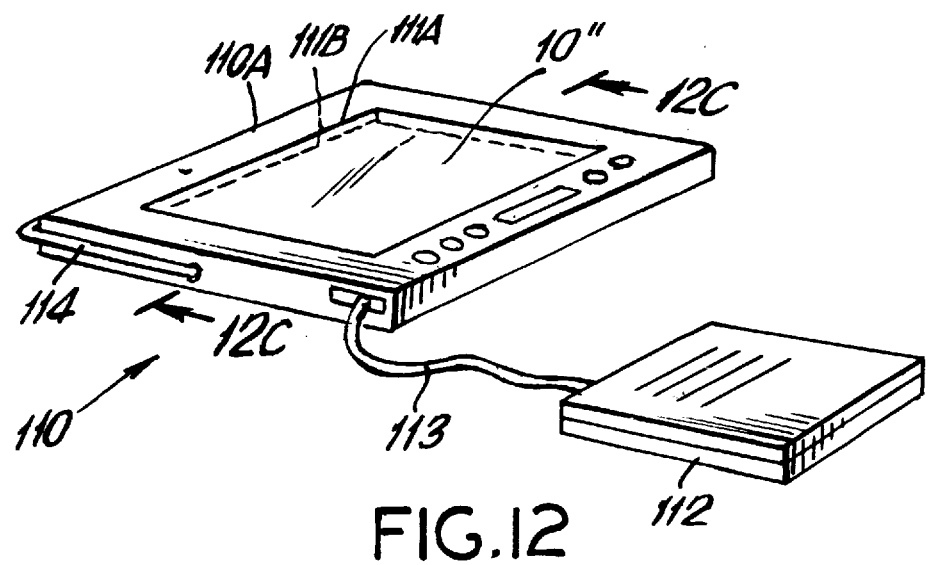
FIG. 12 is a perspective view of the portable image display device of the present invention being used to directly view imagery recorded in a film structure (e.g. film slide) while operated in its backlighting mode.
Figure 12A:
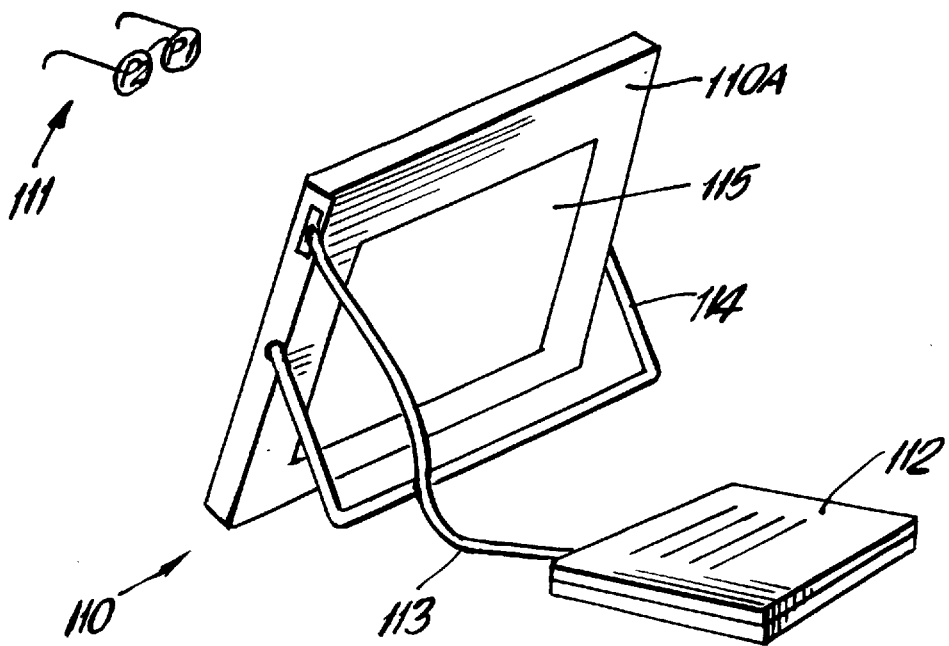
FIG. 12A is a perspective view of the image display device of FIG. 12, shown interfaced with a conventional computer system while being operated in its direct viewing mode.
Figure 12C:
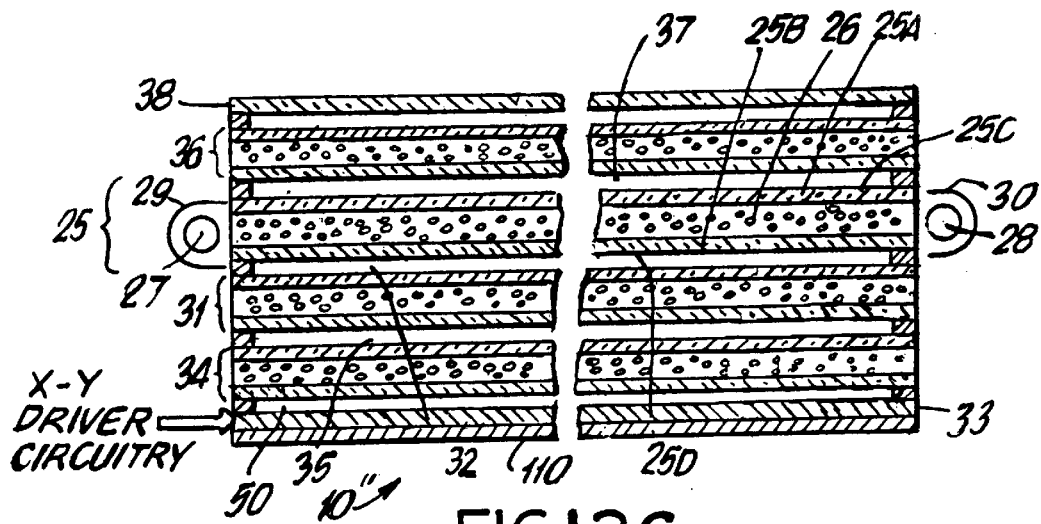
FIG. 12C is a cross-sectional view of the image display panel assembly of the third illustrative embodiment, taken along line 12C—12C of FIG. 12.
Figure 12D:
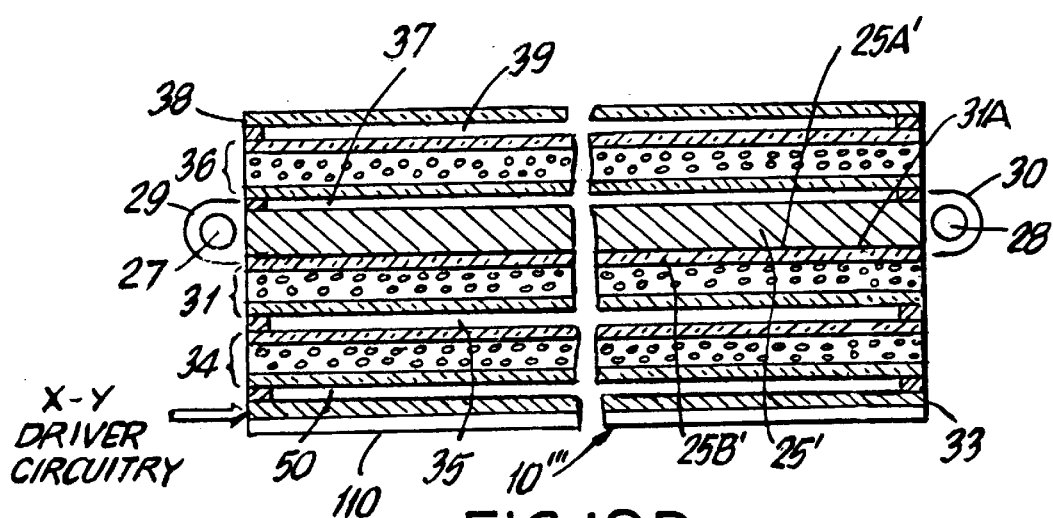
FIG. 12D is a cross-sectional view of the display panel assembly of the fourth illustrative embodiment, also taken along line 12C—12C of FIG. 12.

As shown in FIGS. 12 to 12D, the portable computer-based system of the present invention can be realized as a portable image display system shown incorporating any one of display panel constructions 10, 10', 10", and 10'" described above. As illustrated, portable image display system 110 includes a picture-frame shaped housing 111 having light transmission apertures 111A and 111B, through which display panel construction 10, 10', 10", or 10'" is securely mounted. Preferably, the system components shown in FIG. 2, or their functional equivalents are mounted within portable housing 111 in a conventional manner. While image display system 110 is capable of storing, and even generating frames of color image data, image display system 110 is shown in the drawings interfaced with an auxiliary computer system 112 by way of a conventional serial data communication cable 113. The function of auxiliary computer 113 is to supply color image data (e.g. SMI data) to image display system 110 for display in either its direct viewing mode, shown in FIG. 12A, or in its projection viewing mode, shown in FIG. 12B, using a slightly portable light projection device 60' of the present invention.

In FIG. 12A, image display system 110 is shown vertically supported on a desktop by way of a stand 114 that is hingedly connected to portable housing 111. Stand 114 retracts against the side walls of housing 111 during transport or storage, as shown in FIG. 12. In the direct viewing mode shown in FIG. 12A, rear housing panel 115 is snapped into place over the rear light transmission aperture so that reflective surface 40' is disposed adjacent Fresnel lens panel 38 of display panel assembly 10'. In the configuration shown in FIG. 12A, image display system 110 can be used as a backlighting panel for backlighting slides, transparencies, film structures and the like. To enter the Backlighting Viewing Mode, LCD panel 33 is deactivated, fluorescent tubes 27 and 28 are driven, and no external electric fields are applied across PDLC panels 25, 31 34, and 36. In this mode, rear panel 115 is in place and a plane of light having a uniform intensity distribution emanates from the display surface of the display panel assembly. The plane of light passes through the slide, film structure or transparency placed over the display surface, and is spatial intensity modulated and spectrally filtered thereby to display imagery graphically represented therein. In the Backlighting Viewing Mode, the slide, film structure or transparency functions as a non-programmable spatial light mask placed over the backlighting panel of the present invention.

As shown in FIG. 12B, image display system 110 is configured for projection viewing by simply removing rear housing panel 115, arranging portable light projection device 60' about the housing as shown, and then selecting the Projection Viewing Command, as described above. In this embodiment of the present invention, portable light projection device 60' is similar to light projection device 60 shown in FIG. 4, except for several minor modifications. First, portable light projection device 60' and image display system 110 are designed so that the housings of each are adapted to interfit into a single housing of compact construction, as shown in FIG. 12. Second, first housing portion 61' is constructed similar to second housing portion 62, in that first housing portion 61' can be telescopically extended to a required height by frictional engagement amongst sleeves 61A and 61B. Third, divergent polarized light rays emerge from side wall 61C of first housing portion 61' so that it can be directed through display panel assembly 10" without reflection off specularly reflective surface 40' on the inside surface of rear housing panel 115.

Once configured as shown in FIG. 12B, portable light projection device 60' is adjusted as follows. First, the height of first housing section 61 is adjusted so that the optical axis of projection lens 78 in the first housing portion is aligned with the optical axis of Fresnel lens panel 38 in display panel assembly 10". Then, the height of optical platform 80 in the second housing portion is adjusted so that the optical axis of projection lens 82 in the second housing portion is aligned with the optical axis 117 of Fresnel lens 38. Finally, with power supplied to light source 73 and light emitting therefrom, the position of projection lens 82 along the optical axis of Fresnel lens panel 38 is adjusted so that the images formed on the display surface of by LCD panel 33 are projected onto viewing surface 89, as enlarged focused SMI images.

Figure 13:
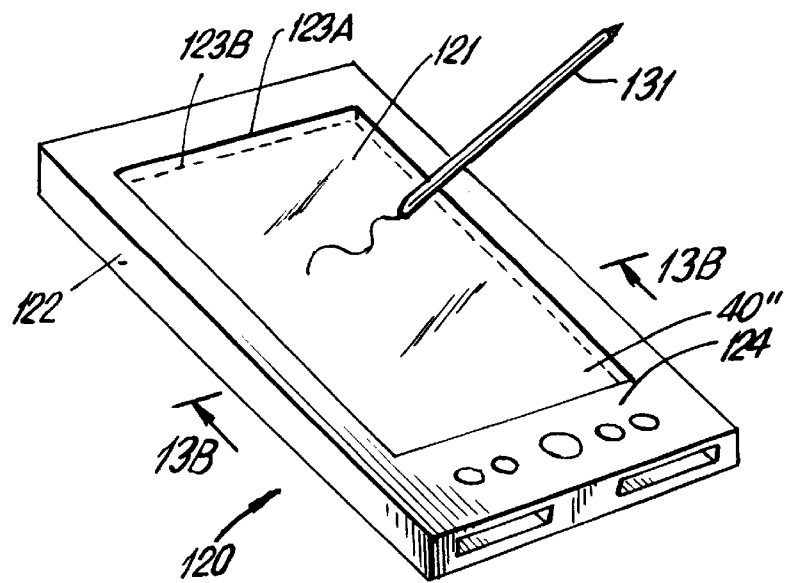
FIG. 13 is a perspective view of the portable pen-computing device of the present invention, shown being used in its pen-type data entry mode of operation, and direct viewing modes of operation.
Figure 13A:
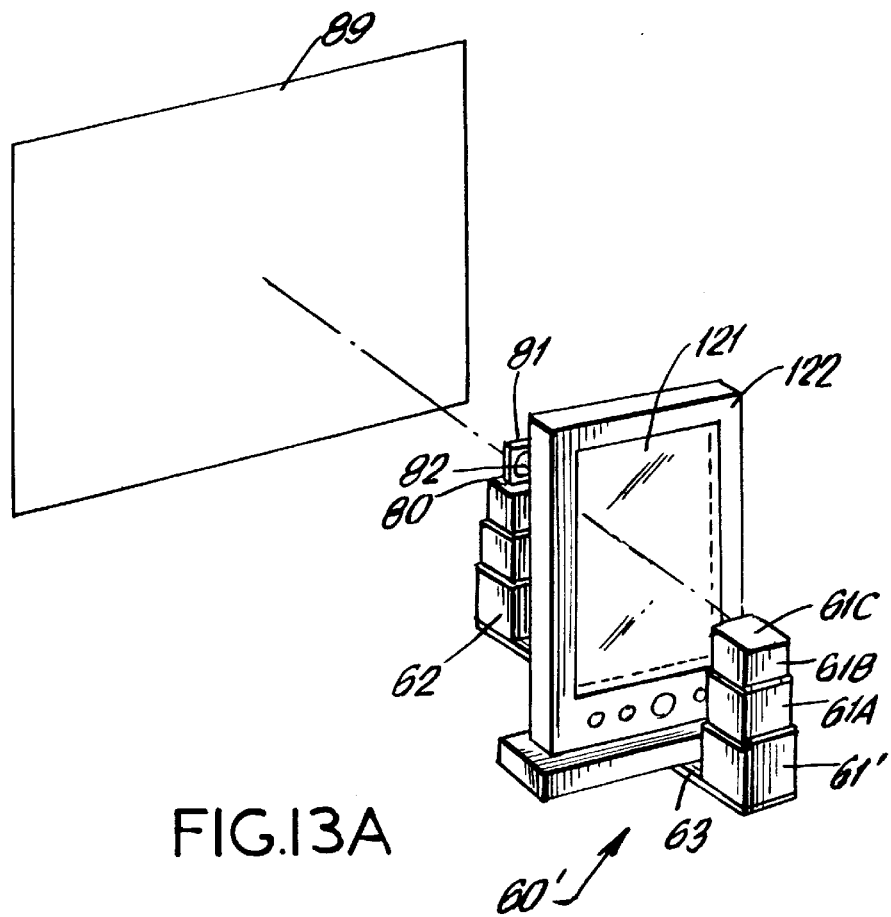
FIG. 13A is a cross-sectional view of the portable pen computing device of the present invention, taken along line 13A—13A of FIG. 13, showing in greater detail the construction of the display/touch-screen panel assembly employed therein.
Figure 13B:
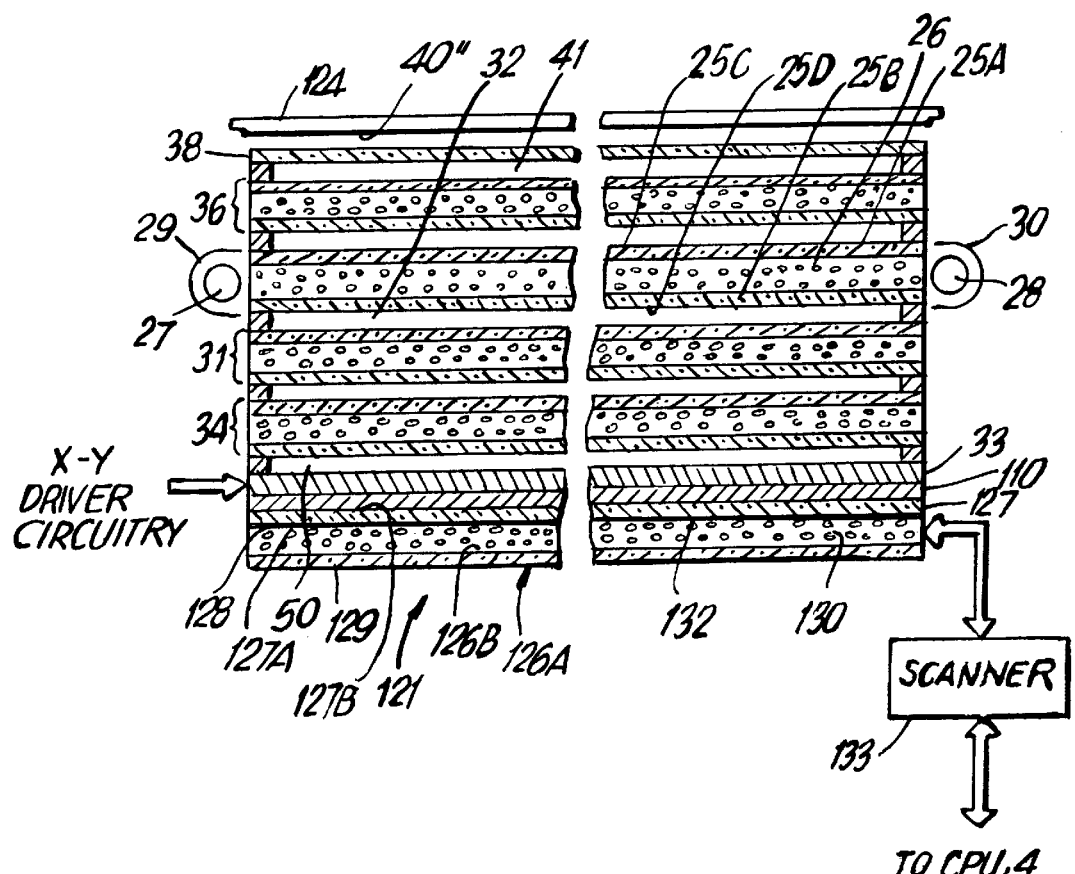
FIG. 13B is a perspective view of the portable pen-computing device of the present invention, shown being operated in its projection viewing mode.

As shown in FIGS. 13 to 13B, the portable computer-based system of the present invention can be realized as a portable pen-computing device. In the illustrative embodiment, portable pen-computing device 120 is a computer-based system having a general system architecture, as shown in FIG. 2. In addition, however, it incorporates the display/touch-screen panel assembly 121 illustrated in FIG. 13B in order to provide the same with a pen-type mode of data entry, and direct and projection modes of stereoscopically viewing 3-D objects. All of these system components are mounted within a hand-supportable housing 122 that has light transmission apertures 123A and 123B through which display/touch-screen panel assembly is supported using conventional display panel mounting techniques known in the art. A rear panel 124 snap-fits into place to cover rear light transmission aperture 123B during the direct viewing mode of operation, shown in phanton in FIG. 13. As shown in FIG. 13B, rear panel 124 supports specularly reflective layer 40".

As illustrated in FIG. 13A, optically transparent touch-screen/display panel 121 panel comprises a number of components, namely: display panel construction 10, 10', 10" or 10''' (preferably 10"); a writing panel 126 having first and second surfaces 126A and 126B, respectively; a base panel 127 having first and second surfaces 127A and 127B, respectively; a plurality of optically transparent ultra-thin conductive strips 128 applied to the second surface 127A of base panel 127 in a spaced apart manner on the order of inter-pixel spacing of a suitable spatial resolution; an optically transparent conductive layer 129 applied to the second surface 126B of the writing panel; and a non-conductive viscous gel 130 disposed between and electrically isolating the writing panel from the base panel. As shown, the second surface of base panel 127B is directly affixed to the display surface of LCD panel 33 of the display panel assembly. Writing surface 126A is exposed to the ambient environment.

The writing panel 126 is made of flexible optically transparent material, such as Mylar, which elastically deforms in response to the application of pressure on writing surface 126A by, for example, a writing stylus 131 moved thereover during conventional writing operations by its user. Preferably, base panel 127 is made from an optically transparent material such as glass, although other materials may be used without significantly compromised performance. Non-conductive gel 130 contains microscopic spheres 132 made of substantially non-conductive material, such as plastic, and are free to move within non-conductive gel 130 in response to the application of pressure by writing stylus 131.

As shown in FIG. 13A, each optically transparent conductive strip 128 extends parallel to every other optically transparent conductive strip and each such conductive strip is preassigned a corresponding x-coordinate value along the x-coordinate direction of the 2-D array represented along the writing surface. The y-coordinate direction in the 2-D array extends along each optically transparent conductive strip.

Whenever the stylus is moved over the writing surface, the pressure path formed therealong at each instant in time, elastically deforms the writing surface, and causes the plastic microspheres to move away from under the tip of the writing stylus. This permits a selected one of the optically transparent conductive strips 128 to momentarily establish contact with optically transparent conductive layer 129 and in response to the voltage applied across strips 128 and conductive layer 129, a small electrical current to flows therebetween. A scanning mechanism 133 is operably associated with the conductive strips and conductive layer, to cyclically determine, at each scanning interval, the x-coordinate value associated with the optically transparent conductive strip that establishes contact with the optically transparent conductive layer. The scanning mechanism also measures the small electrical current flow associated with the established electrical contact. Using this small current measure, the scanning mechanism computes the resistance associated with the circuit formed by the point of electrical contact beneath the elastically deformable writing surface. Then, using a preconstructed resistance/y-coordinate look-up table, the computed resistance measure is converted into a corresponding y coordinate value on the writing surface. For each x, y coordinate pair assembled as described above, the processor is able to construct an image data set of the graphical pattern that was traced out on the writing surface over a specified time interval. This image data set is stored in bit-mapped form in memory (e.g. VRAM) for subsequent display using display panel assembly 10 of the portable pen-computing device of the present invention.

Figure 14:
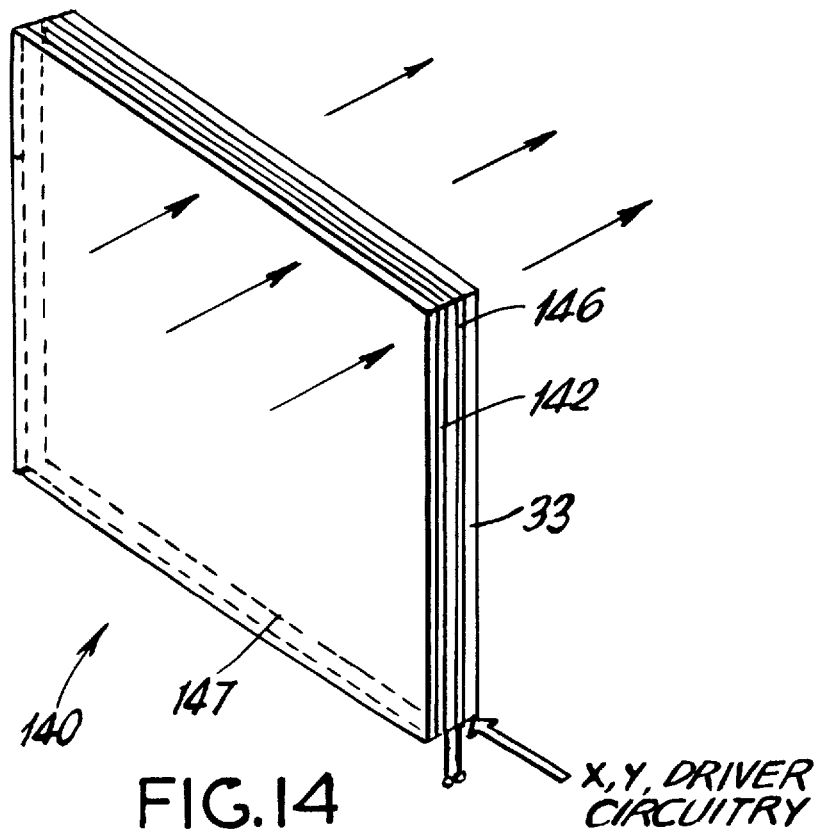
FIG. 14 is a perspective view of yet another embodiment of the electro-optical backlighting panel of the present invention, realized using electroluminescent materials.
Figure 14A:
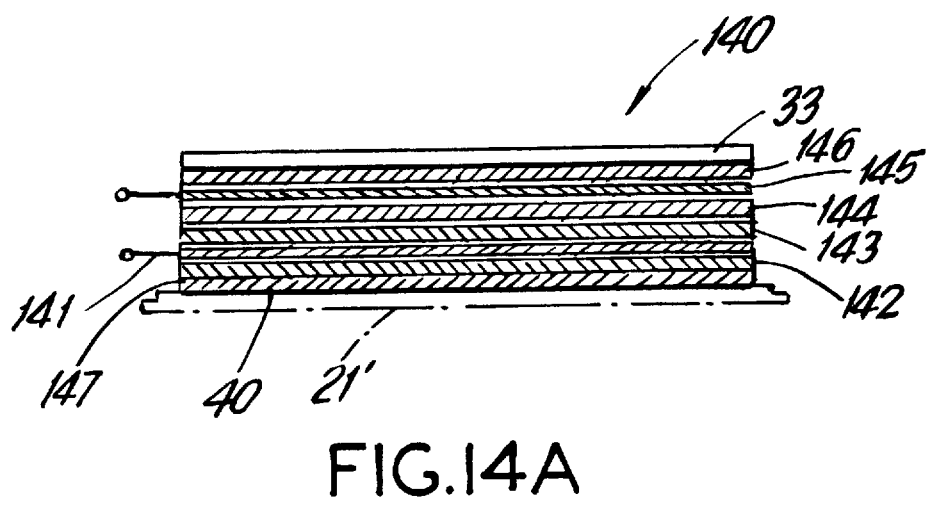
FIG. 14A is a cross sectional view of the electro-optical backlighting panel of FIG. 14.

Having described the method and apparatus of the present invention with reference to the above illustrative embodiments, several modifications readily come to mind In particular, as illustrated in FIGS. 14 and 14A, the backlighting panel of the present invention can be realized without the use of polymer-dispersed liquid crystal(PDLC) technology. In this alternative embodiment, a flat display panel is constructed by affixing conventional LCD panel 33 to the front surface of backlighting panel 140, which utilizes principles of electroluminescence, rather than disruption of total internal reflection, in order to emit light from the backlighting panel during the light emission state thereof.

As illustrated in FIGS. 14 and 14A, in particular, the flat display panel of this particular embodiment uses an electroluminescent structure having both light emissive and light transmissive modes of operation which, as will be explained above in connection with the other embodiments, are electronically selectable during direct viewing and projection viewing modes of operation, respectively.

As best illustrated in FIG. 14A, backlighting panel 140 can be formed by depositing a thin layer of optically transparent conducting material 141, such as Indium Tin Oxide(ITO) or gold foil, about 20 to 30 Angstroms thick, on a thin optically transparent (support) panel 142, to form a first optically transparent electrode layer thereon. Thereafter, a layer of optically transparent material 143, such as the oxides of aluminum niobium tantalum, is deposited over optically transparent electrode layer 142 and panel 141. Using depositing techniques well known in the art, a layer of electroluminescent material 144 having a high energy-band gap (e.g. greater than 73.0 electron volts) between its conduction and valence bands, such as aluminum dioxide 8.4 electron volts, is deposited over the optically transparent electrode layer 143. The reason that the electroluminescent material must have such a high energy-band gap between its conduction and valence bands is that this condition ensures that the layer of electroluminescent material is optically transparent when the operating voltage (i.e. electric field) is not applied thereacross, and yet emits light when an electric field is applied. Then, a layer of Indium Tin Oxide 145 is applied to a second optically transparent panel 146. Finally, optically transparent panels 141 and 146 are brought together so that electroluminescent layer 144 comes in intimate electrical contact with electrode layer 145, and electroluminescent backlighting panel 140 of integral construction is thereby formed. To the front surface of panel 146, LCD panel 33 is affixed in conventional manner. To the rear surface of panel 142, Fresnel lens panel 147 is affixed in a similar manner described above in connection with the other embodiments of the present invention.

During the direct viewing mode, an external electric field is applied across electrode layers 141 and 145, and in response thereto electrons are excited to the conduction band of electroluminescent material 143 and permitted to drop to the valence band thereof, whereby photons are emitted having wavelengths in the visible portion of the electromagnetic spectrum. Details regarding the physics of the electroluminescent panel hereof during its emission mode are generally described in the paper entitled "Diffraction-grating-enhanced light emission from tunnel junctions" by J. R. Kirtley, et al., published in Applied Physical Letters, Volume 37, No. 5, Sep. 1, 1980, which is incorporated herein by reference. In the direct viewing mode, the reflective layer adjacent Fresnel lens panel 148 functions to reflect light in the direction of LCD panel 133. In general, the intensity distribution of the light emitted from the backlighting panel during this mode of operation is substantially uniform in the x and y coordinate directions, and thus intensity compensation measures are not required.

During the projection viewing mode, no voltage (i.e. electric field) is applied across electrode layers 141 and 145, the backlighting panel 140 is operated in its light transmission state and thus layer 141 and electroluminescent layer 144 are each optically transparent and do not present significant light diffraction or scattering. In the projection viewing mode, rear panel 21' is removed away from Fresnel lens panel 147 and an external source of light, such as from device 60, is projected through the entire flat display panel assembly. In its light transmission state, the projected light rays are first focused by Fresnel lens panel 147 and thereafter pass completely through the electroluminescent panel without substantial scattering or absorption of the light rays. Thereafter, the focused light rays are spatial intensity modulated by LCD panel 33 and after passing through a projection lens, as described hereinabove, are ultimately projected onto a wall surface or projection screen for large field viewing.

In other embodiments of the present invention, flat display panel 140 can be mounted beneath optically transparent writing panel 126, described above, to provide a novel writing/display panel for use in a variety of pen computing applications.

In yet other embodiments of the present invention, micropolarization panel 110 can be affixed to the front display surface of LCD panel 33 of writing panel 126, to permit stereoscopic viewing of spatially multiplexed images.

The modifications described above are merely exemplary. It is understood that other modifications to the illustrative embodiments will readily occur to persons with ordinary skill in the art. All such modifications and variations are deemed to be within the scope and spirit of the present invention as defined by the accompanying Claims to Invention.

What is claimed:

1. An image display device having direct and projection viewing modes of operation, said image display device comprising:

light producing means for producing light during said direct viewing mode;

a light guiding structure formed from optically transparent material, said light guiding structure having first and second light guiding surfaces, and a first light conducting edge through which light produced from said light producing means can be transmitted into said light guiding structure and undergo total internal reflection between said first and second light guiding surfaces;

a light diffusing structure operably associated with said light guiding structure, said light diffusing structure having a light scattering state of operation selectable during said direct viewing mode, and a light non-scattering state of operation selectable during said projection viewing mode;

a spatial light mask, disposed adjacent said light diffusing structure, being optically transparent during said projection viewing mode, and having means for modulating the spatially intensity of light transmitted through said light diffusing structure; and state selection means for selecting said light scattering state of operation for said light diffusing structure during said direct viewing mode, and for selecting said light non-scattering state of operation for said light diffusing structure during said projection viewing mode, wherein during said direct viewing mode, said light diffusing structure scatters light reflected within said light guiding structure and a portion of said scattered light is transmitted through said second light guiding surface of said light guiding structure and said light diffusing structure, and through said spatial light mask, and wherein during said projection viewing mode, said light diffusing structure permits light produced from an external source to be transmitted through the first and second light guiding surfaces of said light guiding structure and said light diffusing structure without substantial scattering, and through said spatial light mask, for spatial intensity modulation of said transmitted light.

2. The image display device of claim 1, which further comprises a light reflective surface removably positionable at a distance from said second light guiding surface of said light guiding structure.

3. The image display device of claim 1, wherein said light diffusing structure comprises a polymer-dispersed liquid crystal panel having optically transparent electrode surfaces.

4. The image display device of claim 1, wherein said spatial light mask comprises a display surface for displaying a composite pixel pattern representative of a spatially multiplexed image composed of first and second spatially modulated perspective images of a 3-D object, said first spatially modulated perspective image consisting of a first pixel pattern representative of a first perspective image of said 3-D object spatially modulated according to a first spatial modulation pattern, said second spatially modulated perspective image consisting of a second pixel pattern representative of a second perspective image of said 3-D object spatially modulated according to a second spatial modulation pattern, said second spatial modulation pattern being a logical complement of said first spatial modulation pattern, and wherein said image display device further comprises a micropolarization panel comprising a optically transparent sheet directly mounted onto said display surface of said spatial light mask, said optically transparent sheet having first and second optically transparent patterns permanently formed in said optically transparent sheet, said first optically transparent pattern spatially corresponding to and being spatially aligned with said first pixel pattern so as to impart a first polarization state P1 to light emanating from said first pixel pattern, and said second optically transparent pattern spatially corresponding to and being spatially aligned with said second pixel pattern so as to impart a second polarization state P2 to light emanating from said second pixel pattern, said second polarization state P2 being different than said first polarization state P1.

5. The image display device of claim 4, wherein said spatial light mask is electrically programmable.

6. The image display device of claim 1, wherein said spatial light mask is electrically programmable, and said light diffusing structure comprises:

a first electro-optical light diffusing panel having first and second light transmission surfaces and a light scattering state of operation selectable during said direct viewing mode, and a light non-scattering state of operation selectable during said projection viewing mode, said first light transmission surface being in direct physical contact with said second light guiding surface of said light guiding structure;

a second electro-optical light diffusing panel having third and fourth light transmission surfaces and a light scattering state of operation selectable during said direct viewing mode, and a light non-scattering state of operation selectable during said projection viewing mode, said third light transmission surface of said second electro-optical light diffusing panel being physically spaced apart from said second light transmission surface of said first electro-optical light diffusing panel, by a first ultra-thin air gap, and said fourth light transmission surface of said second electro-optical light diffusing panel being adjacent said spatial light mask; and a third electro-optical light diffusing panel having fifth and sixth light transmission surfaces and a light scattering state of operation selectable during said direct viewing mode, and a light non-scattering state of operation selectable during said projection viewing mode, said sixth light transmission surface of said third electro-optical light diffusing panel being physically spaced apart from said first light guiding surface of said light guiding structure, by a second ultra-thin air gap.

7. The image display device of claim 6, which further comprises a light reflective surface removably positionable adjacent said fifth light transmission surface of said third electro-optical light diffusing panel.

8. The image display device of claim 6, which further comprises a Fresnel lens structure physically affixed to said third electro-optical light diffusing panel.

9. The image display device of claim 6, wherein said spatial light mask is electrically programmable;

wherein said first electro-optical light diffusing panel is a first electrically-controlled polymer-dispersed liquid crystal panel having a first pair of optically transparent electrode surfaces across which a first electric field is applied under the control of said state selection means;

wherein said second electro-optical light diffusing panel is a second electrically-controlled polymer-dispersed liquid crystal panel having a second pair of optically transparent electrode surfaces across which a second electric field is applied under the control of said state selection means; and wherein said third electro-optical light diffusing panel is a third electrically-controlled polymer-dispersed liquid crystal panel having a third pair of optically transparent electrode surfaces across which a third electric field is applied under the control of said state selection means.

10. The image display device of claim 9, which further comprises a display control means for controlling the spatial intensity of light emanating from said electrically programmable spatial light mask, and wherein said electrically programmable spatial light mask comprises a liquid crystal display panel comprising an array of electrically addressable pixels, each said pixel having a light transmittance that is controllable by said display control means.

11. The image display device of claim 9, wherein said first electrically-controlled polymer-dispersed liquid crystal panel contains a patterned distribution of liquid crystal molecules which in response to said first electric field selectively scatters light along said second light guiding surface of said light guiding structure;

wherein said second electrically-controlled polymer-dispersed liquid crystal panel contains a substantially uniform distribution of liquid crystal molecules which in response to said second electric field selectively scatters light within said second electrically-controlled polymer-dispersed liquid crystal panel so that a substantially uniform light intensity distribution emerges therefrom in the direction of said electrically programmable spatial light mask; and wherein said third electrically-controlled polymer-dispersed liquid crystal panel contains a substantially uniform distribution of liquid crystal molecules which in response to said third electric field selectively scatters light within said third electrically-controlled polymer-dispersed liquid crystal panel so that a substantially uniform light intensity distribution emanates therefrom in the direction of said light guiding structure.

12. The image display device of claim 9, wherein said first electrically-controlled polymer-dispersed liquid crystal panel contains a substantially uniform distribution of liquid crystal molecules, and said first optically transparent electrode surface includes first and second sets of interleaved electrode strips extending substantially parallel to each other, and said first electric field is applied across only said first set of electrode strips and said second electrode layer during said direct viewing mode so that the liquid crystal molecules beneath said second set of electrode strips are randomly oriented and scatter light during said direct viewing mode, and wherein said first electric field is applied across both said first and second sets of interleaved electrode strips and said second electrode layer during said projection viewing mode so that the liquid crystal molecules beneath said first and second sets of interleaved electrode strips are substantially aligned with said first electric field to permit light to pass through said first electrically-controlled polymer-dispersed liquid crystal panel without substantial scattering during said projection viewing mode;

wherein said second electrically-controlled polymer-dispersed liquid crystal panel contains a substantially uniform distribution of liquid crystal molecules which in response to said second electric field selectively scatters light within said second electrically-controlled polymer-dispersed liquid crystal panel so that a substantially uniform light intensity distribution emanates therefrom in the direction of said electrically programmable spatial light mask; and wherein said third electrically-controlled polymer-dispersed liquid crystal panel contains a substantially uniform distribution of liquid crystal molecules which in response to said third electric field selectively scatters light within said third electrically-controlled polymer-dispersed liquid crystal panel so that a substantially uniform light intensity distribution emanates therefrom in the direction of said light guiding structure.

13. The image display device of claim 1, wherein said light guiding structure is made from an optically transparent panel.

14. The image display device of claim 1, wherein said light guiding structure comprises first and second light conducting edges, and wherein said light producing means comprises first and second fluorescent tubes disposed along said first and second light conducting edges, respectively, said first and second fluorescent tubes producing and transmitting light through said first and second light conducting edges during said direct viewing mode.

15. The image display device of claim 14, which further comprises first and second light focusing elements disposed in proximity with said first and second fluorescent tubes, respectively, for focusing light produced from said first and second fluorescent tubes and directing said focused light across said first and second light conducting edges and into said light guiding structure.

16. The image display device of claim 1, which further comprises a Fresnel lens structure adjacent said light guiding structure.

17. The image display device of claim 16, wherein said Fresnel lens is affixed to said light diffusing structure.

18. The image display device of claim 16, in combination with a portable light projection device, wherein said portable light projection device comprises:

a first housing portion containing a light producing means for producing visible light, and a light focusing means for focusing and directing said produced visible light through said display panel assembly for optical processing and conversion into an image on the display surface of said spatial light mask; and a second housing portion having an image projecting lens for projecting onto a viewing surface, the image displayed on the display surface of said display panel assembly.

19. The image display device of claim 18, which further comprises a light polarizing filter disposed in said first housing portion, for imparting a selected polarization state to visible light transmitted through said display panel assembly.

20. The image display device of claim 19, which further comprises a portable housing having a light transmission aperture though which said unitary display panel assembly is supported.

21. The image display device of claim 1, wherein said light producing means, said light guiding structure and said light diffusing structure form a unitary display panel assembly.

22. The image display device of claim 1, which further comprises an optically transparent touch-screen panel disposed adjacent said spatial light mask.

23. The image display device of claim 1, which further comprises a thin light focusing panel adjacent said light guiding structure.

24. The image display device of claim 4, in combination with polarization glasses.

25. The image display device of claim 24, which further comprises an optically transparent touch-screen panel adjacent said spatial light mask.

26. A portable computer-based system having direct and projection viewing modes of operation, comprising:

a housing of compact construction;

data storage means, disposed in said housing, for storing data representative of one or more images; and a display panel assembly, supported within said housing, said display panel assembly including light producing means for producing light during said direct viewing mode, a light guiding structure having first and second light guiding surfaces between which said produced light can be totally internally reflected during said direct viewing mode, a light diffusing structure operably associated with said light guiding structure, said light diffusing structure having a light scattering state of operation selectable during said direct viewing mode, and a light non-scattering state of operation selectable during said projection viewing mode, a programmable spatial light mask, disposed in direct physical contact with said light diffusing structure, being optically transparent during said projection viewing mode, and including means for modulating the spatial intensity of light transmitted from said light diffusing structure and through said programmable spatial light mask, and state selection means for selecting said light scattering state of operation for said light diffusing structure during said direct viewing mode, and for selecting said light non-scattering state of operation for said light diffusing structure during said projection viewing mode, wherein during said light scattering state of operation, said light diffusing structure scatters light reflected within said light guiding structure and a portion of said scattered light is transmitted through said second light guiding surface of said light guiding structure and said light diffusing structure, and through said programmable spatial light mask, and wherein during said projection viewing mode, said light diffusing structure permits light produced from an external source to be transmitted through the first and second light guiding surfaces of said light guiding structure and said light diffusing structure without substantial scattering, and through said programmable spatial light mask, for spatial intensity modulation of said transmitted light.

27. The portable computer-based system of claim 26, wherein said light guiding structure further comprises a first light conducting edge through which light produced from said light producing means can be transmitted into said light guiding structure for total internal reflection between said first and second light guiding surfaces.

28. The portable computer-based system of claim 26, wherein said display panel assembly is in the form of a unitary structure.

29. The portable computer-based system of claim 26, which further comprises a light reflective surface removably positionable at a distance from said first light guiding surface of said light guiding structure.

30. The portable computer-based system of claim 26, wherein said light diffusing structure comprises a polymer-dispersed liquid crystal panel having optically transparent electrode surfaces.

31. The portable computer-based system of claim 26, wherein said programmable spatial light mask includes a display surface for displaying a composite pixel pattern representative of a spatially multiplexed image composed of first and second spatially modulated perspective images of a 3-D object, said first spatially modulated perspective image consisting of a first pixel pattern representative of a first perspective image of said 3-D object spatially modulated according to a first spatial modulation pattern, said second spatially modulated perspective image consisting of a second pixel pattern representative of a second perspective image of said 3-D object spatially modulated according to a second spatial modulation pattern, said second spatial modulation pattern being a logical complement of said first spatial modulation pattern, and wherein said display panel assembly further comprises a micropolarization panel comprising an optically transparent sheet mounted onto said display surface of said programmable spatial light mask, said optically transparent sheet having first and second optically transparent patterns permanently formed in said optically transparent sheet, said first optically transparent pattern spatially corresponding to and being spatially aligned with said first pixel pattern so as to impart a first polarization state P1 to light emanating from said first pixel pattern, and said second optically transparent pattern spatially corresponding to and being spatially aligned with said second pixel pattern so as to impart a second polarization state P2 to light emanating from said second pixel pattern, said second polarization state P2 being different than said first polarization state P1.

32. The portable computer-based system of claim 26, wherein said light diffusing structure comprises:

a first electro-optical light diffusing panel having first and second light transmission surfaces and a light scattering state of operation selectable during said direct viewing mode, and a light non-scattering state of operation selectable during said projection viewing mode, said first light transmission surface being in direct physical contact with said second light guiding surface of said light guiding structure;

a second electro-optical light diffusing panel having third and fourth light transmission surfaces and a light scattering state of operation selectable during said direct viewing mode, and a light non-scattering state of operation selectable during said projection viewing mode, said third light transmission surface of said second electro-optical light diffusing panel being physically spaced apart from said second light transmission surface of said first electro-optical light diffusing panel, by a first ultra-thin air gap, and said fourth light transmission surface of said second electro-optical light diffusing panel being adjacent said programmable spatial light mask; and a third electro-optical light diffusing panel having fifth and sixth light transmission surfaces and a light scattering state of operation selectable during said direct viewing mode, and a light non-scattering state of operation selectable during said projection viewing mode, said sixth light transmission surface of said third electro-optical light diffusing panel being physically spaced apart from said first light guiding surface of said light guiding structure, by a second ultra-thin air gap.

33. The portable computer-based system of claim 32, which further comprises a light reflective surface removably positionable against said third electro-optical light diffusing structure.

34. The portable computer-based system of claim 32, wherein said display panel assembly further comprises a thin lens panel mounted to said third electro-optical light diffusing panel.

35. The portable computer-based system of claim 32, wherein said first electro-optical light diffusing panel is a first electrically-controlled polymer-dispersed liquid crystal panel having a first pair of optically transparent electrode surfaces across which a first electric field is applied under the control of said state selection means;

wherein said second electro-optical light diffusing panel is a second electrically-controlled polymer-dispersed liquid crystal panel having a second pair of optically transparent electrode surfaces across which a second electric field is applied under the control of said state selection means; and wherein said third electro-optical light diffusing panel is a third electrically-controlled polymer-dispersed liquid crystal panel having a third pair of optically transparent electrode surfaces across which a third electric field is applied under the control of said state selection means.

36. The portable computer-based system of claim 26, which further comprises a display control means for controlling the spatial intensity of light emerging from said programmable spatial light mask, and wherein said programmable spatial light mask comprises a liquid crystal display panel comprising an array of electrically addressable pixels, each said pixel having a light transmittance controllable by said display control means.

37. The portable computer-based system of claim 35, wherein said first electrically-controlled polymer-dispersed liquid crystal panel contains a patterned distribution of liquid crystal molecules which in response to said first electric field selectively scatters light along said second light guiding surface of said light guiding structure;

wherein said second electrically-controlled polymer-dispersed liquid crystal panel contains a substantially uniform distribution of liquid crystal molecules which in response to said second electric field selectively scatters light within said second electrically-controlled polymer-dispersed liquid crystal panel so that a substantially uniform light intensity distribution emerges therefrom in the direction of said programmable spatial light mask; and wherein said third electrically-controlled polymer-dispersed liquid crystal panel contains a substantially uniform distribution of liquid crystal molecules which in response to said third electric field selectively scatters light within said third electrically-controlled polymer-dispersed liquid crystal panel so that a substantially uniform light intensity distribution emerges therefrom in the direction of said light guiding structure.

38. The portable computer-based system of claim 35, wherein said first electrically-controlled polymer-dispersed liquid crystal panel contains a substantially uniform distribution of liquid crystal molecules, and wherein said first optically transparent electrode surface includes first and second sets of interleaved electrode strips extending substantially parallel to each other, and said first electrical field is applied across only said first set of electrode strips and said second electrode layer during said direct viewing mode so that the liquid crystal molecules beneath said second set of electrode strips are randomly oriented and scatter light during said direct viewing mode, and wherein said first electrical field is applied across both said first and second sets of interleaved electrode strips and said second electrode layer during said projection viewing mode so that the liquid crystal molecules beneath said first and second sets of interleaved electrode strips are substantially aligned with said first electrical field to permit light to pass through said first electrically-controlled polymer-dispersed liquid crystal panel without substantial scattering during said projection viewing mode;

wherein said second electrically-controlled polymer-dispersed liquid crystal panel contains a substantially uniform distribution of liquid crystal molecules which in response to said second electric field selectively scatters light within said second electrically-controlled polymer-dispersed liquid crystal panel so that a substantially uniform light intensity distribution emanates therefrom in the direction of said programmable spatial light mask; and wherein said third electrically-controlled polymer-dispersed liquid crystal panel contains a substantially uniform distribution of liquid crystal molecules which in response to said third electric field selectively scatters light within said third electrically-controlled polymer-dispersed liquid crystal panel so that a substantially uniform light intensity distribution emanates therefrom in the direction of said light guiding structure.

39. The portable computer-based system of claim 26, wherein said light guiding structure is made from an optically transparent plastic.

40. The portable computer-based system of claim 32, wherein said light guiding structure comprises first and second light conducting edges, and wherein said light producing means comprises first and second fluorescent tubes disposed along said first and second light conducting edges, respectively, said first and second fluorescent tubes producing and transmitting light through said first and second light conducting edges during said direct viewing mode.

41. The portable computer-based system of claim 40, wherein said electro-optical display panel assembly further comprises first and second light focusing elements disposed in proximity with said first and second fluorescent tubes, respectively, for focusing light produced from said first and second fluorescent tubes and directing said focused light across said first and second light conducting edges and into said light guiding structure.

* * * * *